(12) United States Patent
Heggem

(10) Patent No.: US 7,899,759 B1
(45) Date of Patent: Mar. 1, 2011

(54) OBTAINING RELIABLE INFORMATION ABOUT A SELLER'S PRACTICES

(76) Inventor: Richard A. Heggem, Morgan Hill, CA (US)

( * ) Notice: Subject to any disclaimer, the term of this patent is extended or adjusted under 35 U.S.C. 154(b) by 1280 days.

(21) Appl. No.: 11/435,444

(22) Filed: May 16, 2006

Related U.S. Application Data

(63) Continuation-in-part of application No. 11/153,929, filed on Jun. 15, 2005, now Pat. No. 7,464,051, which is a continuation-in-part of application No. 10/752,163, filed on Jan. 5, 2004, now abandoned.

(51) Int. Cl.
*G06Q 30/00* (2006.01)
(52) U.S. Cl. .............................. 705/500; 705/26.35
(58) Field of Classification Search ............... 705/26, 705/500; 707/3, 5, 6
See application file for complete search history.

(56) References Cited

U.S. PATENT DOCUMENTS

| | | | |
|---|---|---|---|
| 5,592,375 A | 1/1997 | Salmon et al. | |
| 5,970,492 A | 10/1999 | Nielsen | |
| 6,029,175 A | 2/2000 | Chow et al. | |
| 6,460,036 B1 | 10/2002 | Herz | |
| 7,113,919 B1 | 9/2006 | Norris et al. | |
| 7,124,107 B1 | 10/2006 | Pishevar et al. | |
| 7,310,641 B2 * | 12/2007 | Moore et al. ....................... | 1/1 |
| 2001/0034631 A1 | 10/2001 | Kiselik | |
| 2001/0051913 A1 | 12/2001 | Vashistha et al. | |
| 2002/0013735 A1 | 1/2002 | Arora et al. | |
| 2002/0099592 A1 * | 7/2002 | Donahue ..................... | 705/10 |
| 2002/0099642 A1 * | 7/2002 | Schwankl et al. ............ | 705/37 |
| 2002/0111897 A1 | 8/2002 | Davis | |
| 2002/0165814 A1 | 11/2002 | Lee et al. | |
| 2002/0174089 A1 | 11/2002 | Tenorio | |
| 2002/0198818 A1 | 12/2002 | Scott et al. | |
| 2003/0004850 A1 | 1/2003 | Li et al. | |
| 2003/0055723 A1 * | 3/2003 | English ..................... | 705/14 |
| 2003/0074298 A1 * | 4/2003 | Daum ......................... | 705/37 |
| 2003/0172022 A1 | 9/2003 | Coyne et al. | |
| 2004/0176993 A1 * | 9/2004 | Rajasingham ................ | 705/10 |

(Continued)

FOREIGN PATENT DOCUMENTS

WO     WO-0108067 A1 *    2/2001

OTHER PUBLICATIONS

Wall, M., "Snap up a Bargain at Online Auctions; Web Wise," Times f London, Mar. 25, 2001.*

(Continued)

*Primary Examiner* — Nicholas D Rosen

(57) ABSTRACT

A system for obtaining reliable information about sellers is disclosed. According to an example technique described herein, input that indicates identifying information is received from a user. The identifying information might comprise a company name, a telephone number, a uniform resource locator (URL), a product name, and/or a service name, for example. Stored "reputation" data, which is associated with particular selling entity accounts that are associated with the identifying information, is sent toward the user. The "reputation" data includes ratings that were previously submitted by other users who are not associated with the particular selling entity accounts. The ratings may originate from buying entities that previously did business with the selling entities that are associated with the particular selling entity accounts, for example. Additionally, the data sent toward the user may be customized (e.g., filtered, ranked, and/or sorted) based on criteria that the user specified.

26 Claims, 16 Drawing Sheets

U.S. PATENT DOCUMENTS

| | | | | |
|---|---|---|---|---|
| 2004/0225509 | A1* | 11/2004 | Andre | 705/1 |
| 2005/0055306 | A1 | 3/2005 | Miller et al. | |
| 2005/0096955 | A1 | 5/2005 | Sorensen | |
| 2006/0173963 | A1* | 8/2006 | Roseway et al. | 709/206 |

OTHER PUBLICATIONS

Anon., "New Price Comparison-Shopping Site Saves Online Shoppers," PR Newswire, Nov. 11, 2003.*

Pavlou, P.A., et al., "The Nature and Role of Feedback Text Comments in Online Marketplaces: Implications for Trust Building, Price Premiums, and Seller Differentiation," Information Systems Research, vol. 17, No. 4, Dec. 2006, pp. 392-414.*

Elance, Inc., "Corporate Overview, The Better Way to Buy and Manage Services," 2000-2004, http://www.elance.com/c/static/main/displayhtml.pl?file=about.html&, data retrieved Apr. 1, 2004, pp. 1-2.

Elance, Inc., "Elance History," 2000-2004, http://www.elance.com/c/static/main/displayhtml.pl?file=heritage.html, data retrieved Apr. 1, 2004, pp. 1-2.

* cited by examiner

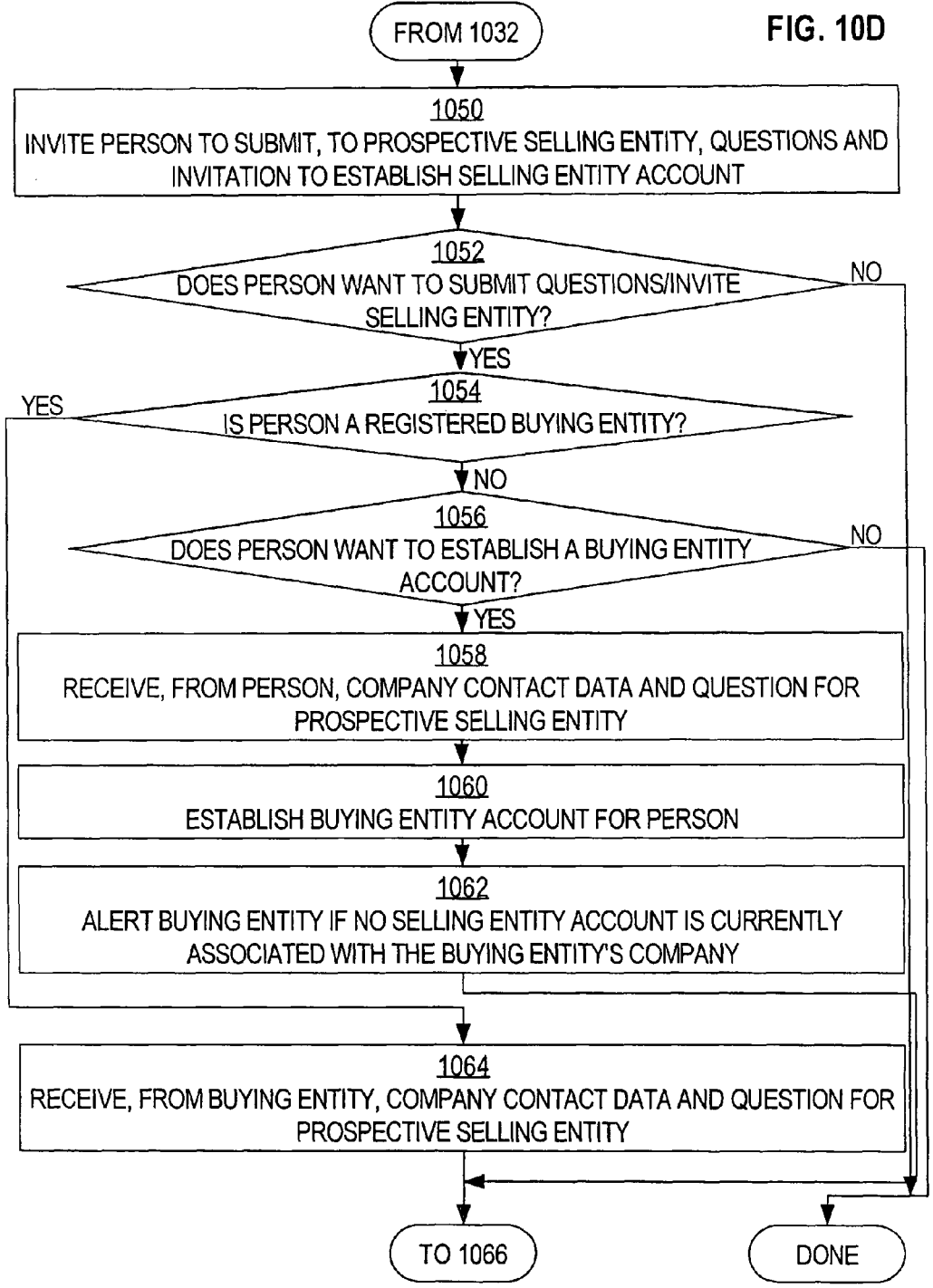

FIG. 11

| | Sellers | | Provided | |
|---|---|---|---|---|
| Sellers: 1-4 of 4 | | | | << Previous | 1 | Next >> |
| Sellers that PASSED my hard filters | | | | |
| 50% | Timothy James | (1) ○(0) | Motion Arts, Inc. | (1) | Question | Invite |
| 50% | Christopher Jon | (2) ○(1) | Motion Arts, Inc. | NR(0) | (More than one) | NR(0) | Question | Invite |
| 50% | Devin Nguyen | (4) ○(0) | Motion Arts, Inc. | (4) | (More than one) | (2) | Question | Invite |
| Sellers that FAILED my hard filters | | | | |
| 0% | Garett Jones | NR(0) ○(0) | Motion Arts, Inc. | NR(0) | SEO Tuning | NR(0) | Question | Invite |

OBTAINING RELIABLE INFORMATION ABOUT A SELLER'S PRACTICES

RELATED APPLICATIONS AND PRIORITY CLAIM

The present application claims priority as a continuation-in-part to U.S. patent application Ser. No. 11/153,929, which was filed on Jun. 15, 2005 now U.S. Pat. No. 7,464,051. U.S. patent application Ser. No. 11/153,929 is itself a continuation-in-part of U.S. patent application Ser. No. 10/752,163, which was filed on Jan. 5, 2004 now abandoned. The present application is also related to U.S. patent application Ser. No. 11/340,905, which was filed on Jan. 27, 2006. The applicant for all of the foregoing applications is Richard A. Heggem. All of the foregoing applications hereby are incorporated by reference in their entirety for all purposes as though fully and originally disclosed herein.

FIELD OF THE INVENTION

The present invention relates generally to information management systems and, more specifically, to a machine-implemented architecture for obtaining reliable and trustworthy information about a seller's business practices and reputation.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business organization and people employed by business organizations often are involved in buying and selling activities. People and organizations who are involved in buying activities may be called "buying entities," and people and organizations who are involved in selling activities may be called "selling entities."

All too often, buying entities are bombarded by large amounts of undesired solicitations from selling entities. These solicitations typically comprise advertisements for selling entities' products and/or services. Solicitations may come through a variety of avenues of communication. A selling entity might call a buying entity on the telephone to solicit the buying entity's business. Alternatively or additionally, a selling entity might send an e-mail message to a buying entity's e-mail address to solicit the buying entity's business.

When a selling entity calls a buying entity on the telephone, the buying entity may view the call as a harassment or annoyance. Answering the telephone and communicating with the selling entity often requires the buying entity to interrupt other important tasks. At a minimum, communicating with the selling entity uses some of the buying entity's precious time. If the buying entity is not interested in the solicitation, then the buying entity is faced with the difficult task of terminating the telephone call as quickly as possible. Doing this in a polite manner can be difficult, especially when the selling entity is insistent. Faced with this task too often, a buying entity may become frustrated and angry, and vent these emotions on later-calling selling entities. Such emotional exchanges are not pleasant for either buying entities or selling entities, and are hardly conducive to business.

Similarly, when a selling entity sends an e-mail message to a buying entity, the buying entity may view the e-mail as a harassment or annoyance. A buying entity's e-mail inbox may become congested with "spam" e-mail messages. Separating interesting e-mail messages from spam e-mail messages can be a time-consuming process. A buying entity may have difficulty distinguishing, quickly, between interesting e-mail messages and spam e-mail messages. When a buying entity responds to a selling entity's e-mail message in an effort to cause the selling entity to desist, the response identifies the buying entity to the selling entity. The selling entity often takes the response as verification that the buying entity's e-mail address is valid and active. The selling entity might even compile a list of verified buying entities' e-mail addresses and sell the list to other selling entities. As a result, buying entities that ask selling entities to stop sending e-mailed solicitations may receive an even greater volume of e-mailed solicitations.

One approach to dealing with unwanted telephone calls is to stop answering telephone calls that originate from unknown telephone numbers. Callers' telephone numbers can be detected and displayed by caller identification devices. Similarly, one approach to dealing with unwanted e-mail is to delete, automatically, all e-mail messages that do not originate from known and trusted e-mail addresses. Unfortunately, these approaches can be over-inclusive. There may be some solicitations, even from unknown selling entities, in which a buying entity would be interested.

On the other hand, selling entities are constantly faced with the challenge of directing solicitations to buying entities that are interested in the selling entities' products and/or services. A selling entity might send solicitations in massive amounts to a multitude of different buying entities in hopes that at least a few of those buying entities will be interested. However, this approach tends to alienate uninterested buying entities. Many times, the temporal and monetary cost of contacting interested buying entities outweighs the value of the contacts made. Given many buying entities' reluctance to have any contact with any unknown selling entities, a selling entity may be blocked from contacting even those buying entities that probably would be interested in the selling entity's products and/or services.

Selling entities usually are in competition with other selling entities. When multiple selling entities solicit the same buying entity, each of the selling entities may have difficulty distinguishing itself, to the buying entity, from the other selling entities. Likewise, the buying entity might not have a sufficient informational basis for selecting one selling entity over another, especially if the buying entity is unfamiliar with any of the selling entities. A buying entity may not know whom to trust.

As is discussed above, prospective buying entities are often bombarded by solicitations from selling entities. These solicitations may take the form of radio, television, printed, or computer-displayed advertisements, for example. In such advertisements, selling entities often make incredible claims about their products and/or services in order to entice prospective buying entities into purchasing those products and/or services. Unfortunately, because these advertisements are produced by the selling entities or their agents, the claims made in these advertisements are often biased, exaggerated, or misleading. All too often, testimonials presented within such advertisements are purchased and insincere. Competing selling entities sometimes even denigrate their competitors in their advertisements. Advertisements usually do not tell the whole story about the selling entities whose products and/or services the advertisements promote.

Consequently, in such advertisements, there is usually little or no valuable information that a prospective buying entity can use to make an informed decision about whether to purchase the products and/or services promoted within those advertisements. Based on the foregoing, a technique or system for allowing prospective buying entities to obtain reliable and trustworthy information about selling entities' business practices and reputations would be highly desirable.

SUMMARY OF THE INVENTION

A system and architecture for allowing prospective buying entities to obtain reliable and trustworthy information about selling entities' business practices and reputations is disclosed. At least some embodiments of the system build upon and make use of various inventions disclosed in U.S. patent application Ser. No. 11/153,929.

According to one aspect of a technique described herein, input that indicates identifying information is received from a user over a computer network such as the Internet. The identifying information may be information that the user saw or heard in an advertisement, for example. The identifying information might comprise a company name, a telephone number, a uniform resource locator (URL), a product name, and/or a service name, for example.

In response to the receipt of the identifying information, a determination is made as to whether there exist any registered selling entity accounts that are associated with the identifying information, as indicated by previously stored data. In response to a determination that at least one selling entity account is associated with the identifying information, stored "reputation" data, which is associated with particular selling entity accounts that are associated with the identifying information, is sent toward the user over a computer network such as the Internet.

The "reputation" data sent toward the user includes ratings that were previously submitted by other users who are not associated with the particular selling entity accounts. The ratings may originate from buying entities that previously did business with the selling entities that are associated with the particular selling entity accounts, for example.

Additionally, the data sent toward the user may be customized (e.g., filtered, ranked, and/or sorted) based on criteria that the user specified.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 10A-F show a flow diagram that depicts a technique for allowing buying entities to obtain reliable and trustworthy information about selling entities' business practices and reputations, in accordance with an embodiment of the invention.

FIG. 11 shows an example of what specific information about selling entities associated with identifying information might look like, in accordance with an embodiment of the invention.

DETAILED DESCRIPTION OF THE INVENTION

Figure 1:
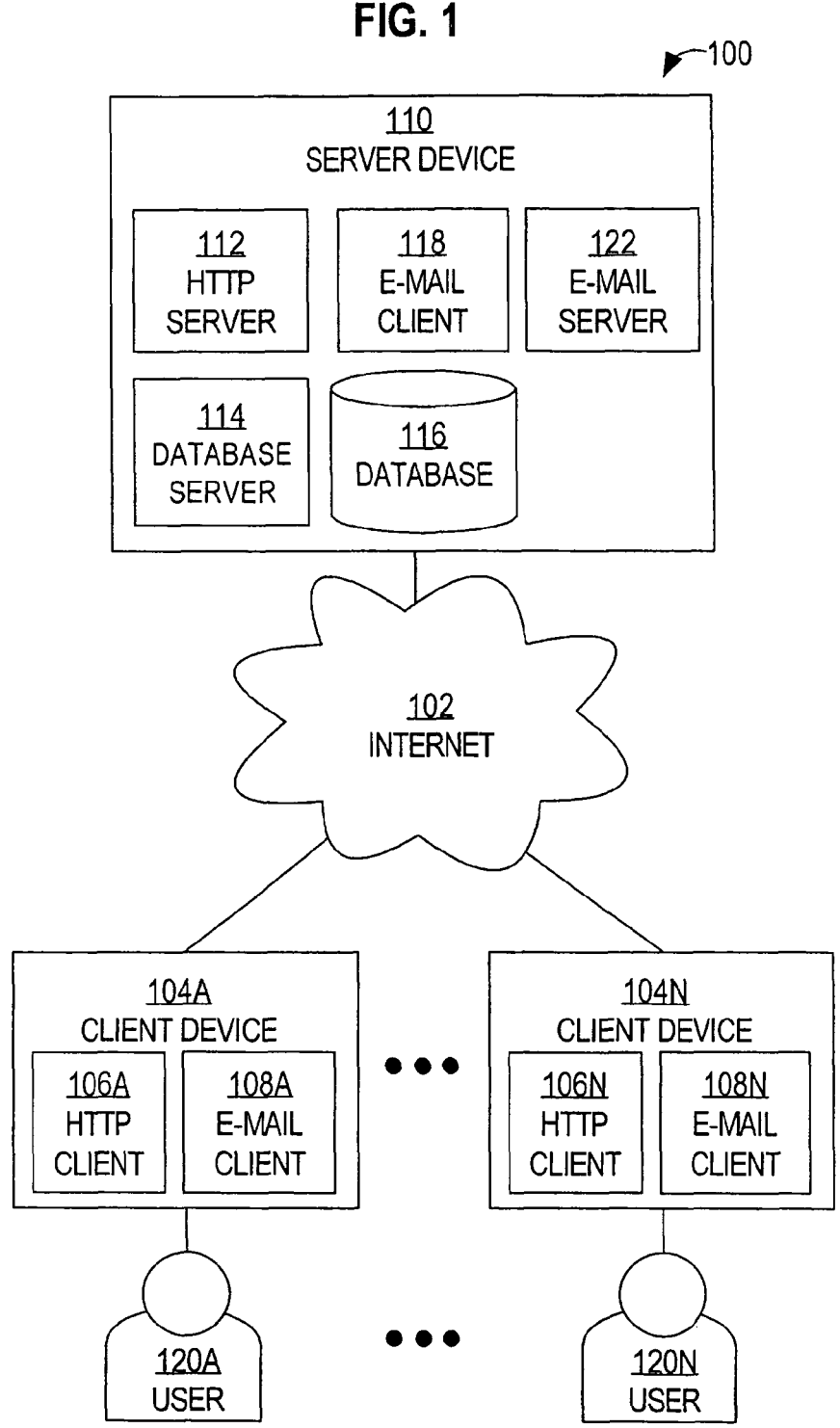
FIG. 1 is a block diagram that depicts a system for connecting buying entities with selling entities, in accordance with an embodiment of the invention.

A method and apparatus for allowing prospective buying entities to obtain reliable and trustworthy information about selling entities' business practices and reputations is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. SYSTEM ARCHITECTURE OVERVIEW
III. REDIRECTING SOLICITATIONS
IV. TARGETING SOLICITATIONS
V. Ranking Solicitations
VI. NOTIFICATION PREFERENCES
VII. ACTING ON SOLICITATIONS
VIII. NEEDCASTS™ AND AGENTS
IX. PIPELINE PHASES AND RATINGS
X. ONGOING RELATIONSHIP PHASE
XI. TRUSTED BUYER NETWORK
XII. REFERRAL INCENTIVES
XIII. OBTAINING RELIABLE INFORMATION ABOUT A SELLER'S PRACTICES
XIV. COMPANY RATINGS OVERVIEW DISPLAY
XV. IMPLEMENTATION MECHANISMS, ALTERNATIVES & EXTENSIONS I. Overview A system and architecture for allowing prospective buying entities to obtain reliable and trustworthy information about selling entities' business practices and reputations is disclosed. According to example technique described below— especially in Section XIII, "OBTAINING RELIABLE INFORMATION ABOUT A SELLER'S PRACTICES"—input that indicates identifying information is received from a user over a computer network such as the Internet. The identifying information may be information that the user saw or heard in an advertisement, for example. The identifying information might comprise a company name, a telephone number, a uniform resource locator (URL), a product name, and/or a service name, for example.

In response to the receipt of the identifying information, a determination is made as to whether there exist any registered selling entity accounts that are associated with the identifying information, as indicated by previously stored data. In response to a determination that at least one selling entity account is associated with the identifying information, stored "reputation" data, which is associated with particular selling entity accounts that are associated with the identifying information, is sent toward the user over a computer network such as the Internet.

The "reputation" data sent toward the user includes ratings that were previously submitted by other users who are not associated with the particular selling entity accounts. The ratings may originate from buying entities that previously did business with the selling entities that are associated with the particular selling entity accounts, for example.

Additionally, the data sent toward the user may be customized (e.g., filtered, ranked, and/or sorted) based on criteria that the user specified.

II. System Architecture Overview

FIG. 1 is a block diagram that depicts a system 100 for connecting buying entities with selling entities, in accordance with an embodiment of the invention. System 100 includes the Internet 102, client devices 104A-N, and server device 110. Client devices 104A-N are coupled communicatively with Internet 102. Server device 110 also is coupled communicatively with Internet 102. Client devices 104A-N include Hypertext Transfer Protocol (HTTP) clients 106A-N, respectively, and e-mail clients 108A-N, respectively. Server device 110 includes HTTP server 112, database server 114, database 116, e-mail client 118, and e-mail server 122.

Users 120A-N are individual people who use client devices 104A-N, respectively, to send information to and receive information from server device 110. Some of users 120A-N are buying entities, some of users 120A-N are selling entities, and some of users 120A-N are both buying entities and selling entities. Client devices 104A-N are devices that are configured to interface with both a human being and Internet 102. For example, client devices 104A-N may include general-purpose computers, diskless network workstations, and/or Internet appliances.

HTTP clients 106A-N are programs that are configured to send HTTP requests and receive HTTP responses. As used herein, HTTP includes HTTPS. HTTP clients 106A-N are also called "browsers." For example, HTTP clients 106A-N may include Microsoft Internet Explorer, Netscape Navigator, and/or Mozilla Firefox. HTTP clients 106A-N receive information from users 120A-N, respectively, and send that information in the form of HTTP requests to HTTP server 112. HTTP clients 106A-N receive HTTP responses from HTTP server 112 and provide some or all of the information contained in such HTTP responses to users 120A-N, respectively. HTTP clients 106A-N send HTTP requests and receive HTTP responses through Internet 102.

E-mail clients 108A-N are programs that are configured to send and receive e-mail messages according to an e-mail protocol such as Simple Mail Transfer (SMTP) protocol. For example, e-mail clients 108A-N may include Microsoft Outlook. E-mail clients 108A-N receive information from users 120A-N, respectively, and send that information in the form of e-mail messages to an e-mail server. E-mail clients 108A-N receive e-mail messages from e-mail servers and provide some or all of the information contained in such e-mail messages to users 120A-N, respectively. E-mail clients send and receive e-mail messages through Internet 102.

Like client devices 104A-N, server device 110 is a device that is configured to interface, directly or indirectly, with Internet 102. For example, server device 110 may be a general-purpose computer. HTTP server 112 is a program that is configured to receive HTTP requests and send HTTP responses. HTTP server 112 is also called a "web server." HTTP server 112 receives HTTP requests from HTTP clients 106A-N through Internet 102. HTTP server 112 sends HTTP responses to HTTP clients 106A-N through Internet 102.

HTTP server 112 may interface with a variety of programs that reside on server device 110. HTTP server 112 may send, to such programs, information received in HTTP requests. Similarly, HTTP server 112 may receive, from such programs, information that HTTP server 112 then sends in HTTP responses.

Database server 114 is a program that is configured to receive database commands from programs resident on server device 110. Database server 114 also is configured to execute such database commands to store data in, modify data in, or retrieve data from database 116. Database server 114 also is configured to send retrieved data to programs resident on server device 110. For example, database commands may take the form of Structured Query Language (SQL) statements. Database server 114 may select, from database 116, data that satisfies criteria specified in such SQL statements.

E-mail client 118 is similar to e-mail clients 108A-N in that e-mail client 118 also is a program that is configured to send and receive e-mail messages according to an e-mail protocol. E-mail client 118 receives information from programs resident on server device 110, and sends that information in the form of e-mail messages to e-mail server 122. E-mail client 118 receives e-mail messages from e-mail server 122 and provides some or all of the information contained in such e-mail messages to programs resident on server device 110.

Database 116 stores information about one or more buyer accounts and one or more seller accounts. Each of users 120A-N may be associated with one or more buyer accounts and/or one or more seller accounts. Among other information, each account may be associated with a separate username, password, and an account type that indicates whether that account is a buyer account or a seller account. For each account, database 116 stores a separate set of information items that are associated with that account. The set of information items associated with a particular account may vary depending on the account's account type.

Figure 2:
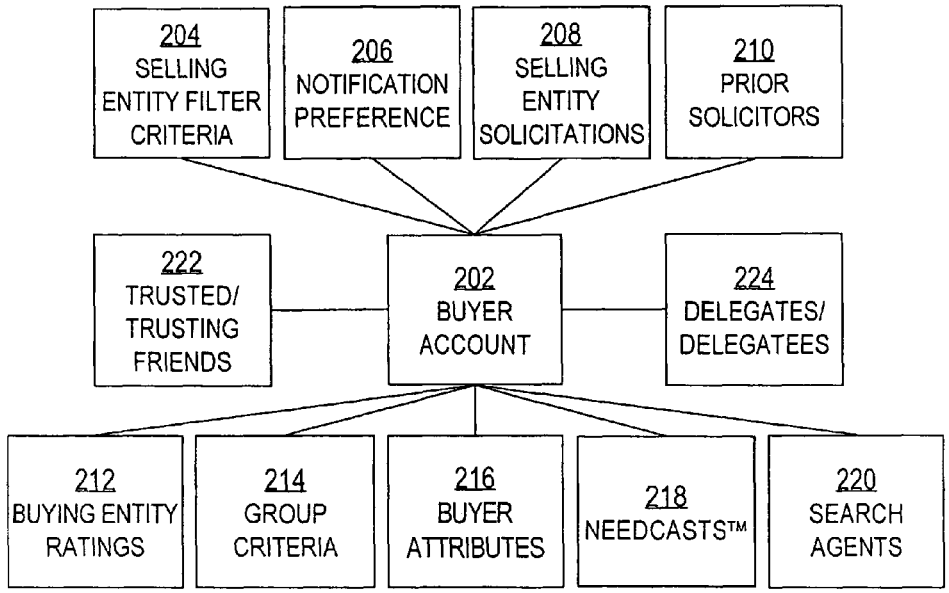
FIG. 2 is a block diagram that depicts a set of information items that may be associated, in a database, with a buyer account, in accordance with an embodiment of the invention.

FIG. 2 is a block diagram that depicts a set of information items that may be associated, in a database, with a buyer account, in accordance with an embodiment of the invention. For example, the information items depicted in FIG. 2, and the associations between those information items and a buyer account, may be stored in database 116.

A buyer account 202 may be associated with a username that is unique among usernames stored in database 116. Buyer account 202 may be associated with a set of information items including selling entity filter criteria 204, a notification preference 206, selling entity solicitations 208, prior solicitors 210, buying entity ratings 212, group criteria 214, buyer attributes 216, Needcasts™ 218, trusted and trusting friends 222, and delegates and delegatees 224. Different buyer accounts may be associated with separate sets of such information items. For example, a first buyer account may be associated with a first set of selling entity filter criteria, and a second, separate buyer account may be associated with a second, separate set of selling entity filter criteria.

Figure 3:
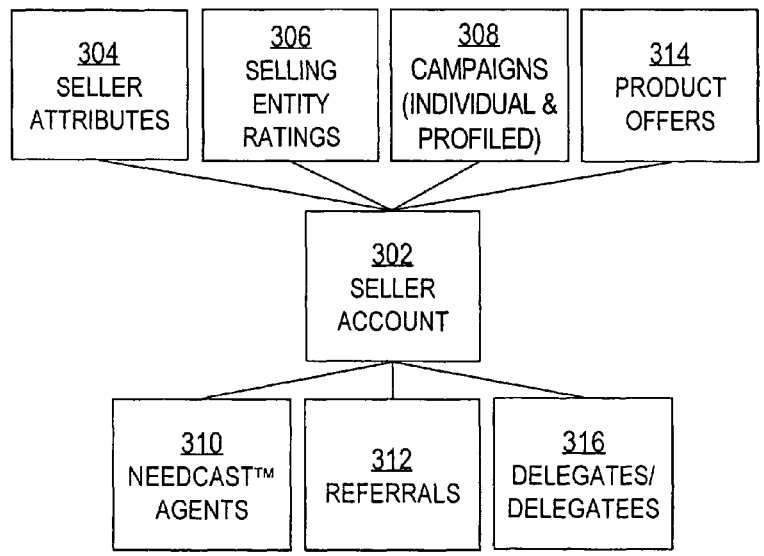
FIG. 3 is a block diagram that depicts a set of information items that may be associated, in a database, with a seller account, in accordance with an embodiment of the invention.

FIG. 3 is a block diagram that depicts a set of information items that may be associated, in a database, with a seller account, in accordance with an embodiment of the invention. For example, the information items depicted in FIG. 3, and the associations between those information items and a seller account, may be stored in database 116.

A seller account 302 may be associated with a username that is unique among usernames stored in database 116. Seller account 302 may be associated with a set of information items including seller attributes 304, selling entity ratings 306, campaigns (individual and profiled) 308, Needcast™ agents 310, referrals 312, product offers 314, and delegates and delegatees 316. Different seller accounts may be associated with separate sets of such information items. For example, a first seller account may be associated with a first set of campaigns, and a second, separate buyer account may be associated with a second, separate set of campaigns.

Information items described above may be used in interactions between components of system 100. Examples of such components using these information items are described in further detail below.

III. Redirecting Solicitations

In one embodiment of the invention, system 100 includes a mechanism that facilitates the redirection of solicitations, which have been directed to a buying entity, to server device 110 instead. When a buying entity receives a telephone call from a selling entity, the buying entity may instruct the selling entity, via voice, voicemail, or proxy, to access server device 110 instead of calling the buying entity. Alternatively or additionally, when a buying entity receives an e-mail message from a selling entity, the buying entity may forward the e-mail message to server device 110, which may responsively and automatically send, to the selling entity, an e-mail message that instructs the selling entity to access server device 110 instead of sending e-mail messages to the buying entity. To motivate the selling entity to use the services offered by server device 110, server device 110 may offer the selling entity a guarantee that all solicitations sent through server device 110 will be delivered to the buying entity.

Figure 4:
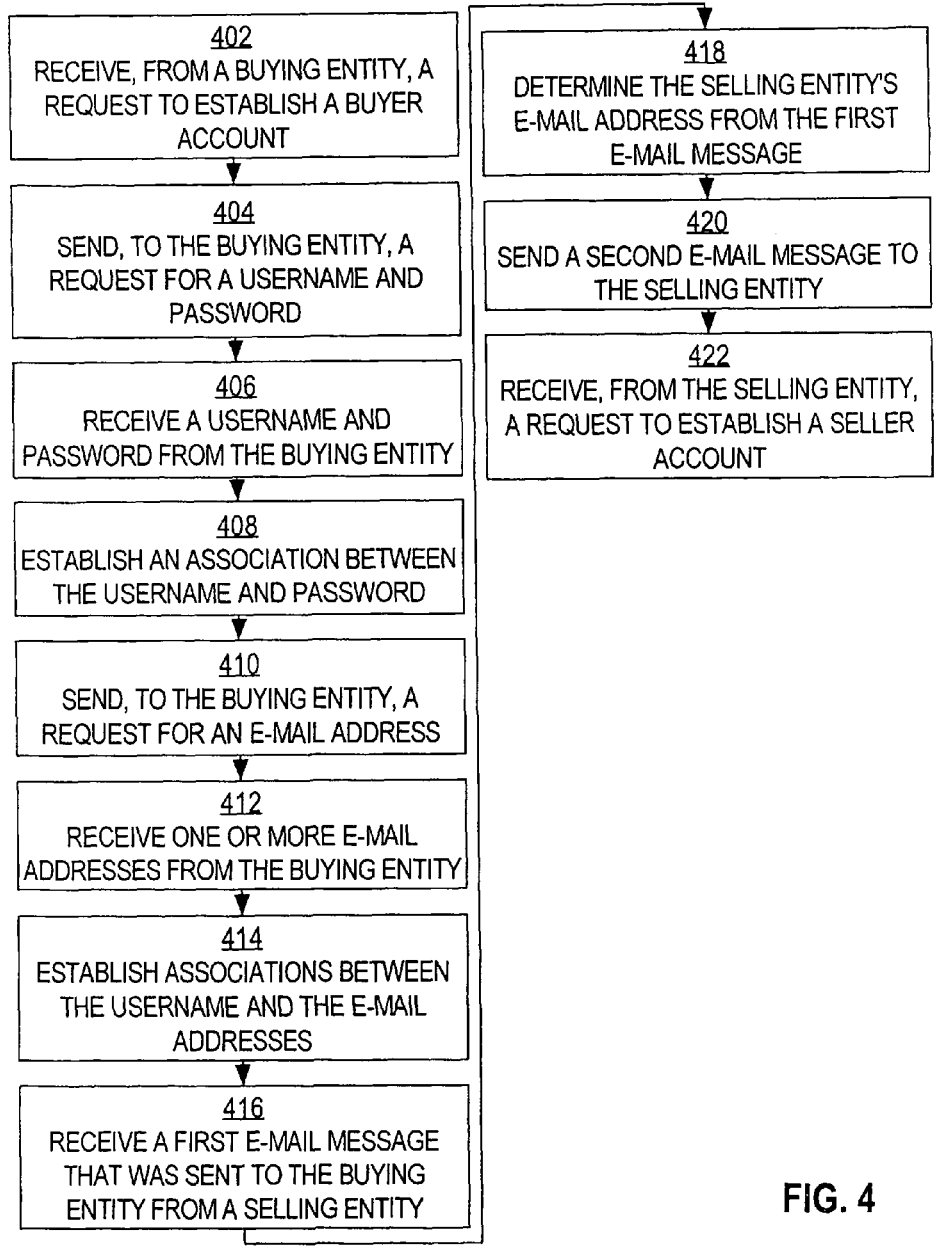
FIG. 4 is a flow diagram that depicts a technique for redirecting e-mailed solicitations, in accordance with an embodiment of the invention.

FIG. 4 is a flow diagram that depicts a technique for redirecting e-mailed solicitations, in accordance with an embodiment of the invention. The approach depicted in FIG. 4 may be implemented, for example, by server device 110.

In block 402, a request to establish a buyer account is received from a buying entity. For example, HTTP server 112 may receive, from HTTP client 106A, a request to establish a buyer account for user 120A. In block 404, a request for a username and password is sent to the buying entity. For example, HTTP server 112 may send, to HTTP client 106A, a request for a username and password. In block 406, a username and password is received from the buying entity. For example, HTTP server 112 may receive, from HTTP client 106A, a username and password selected by user 120A. In block 408, an association is established between the username and the password. For example, database server 114 may establish, in database 116, an association between the username and password. As a result, a buyer account is established in database 116. In one embodiment of the invention, in response to the establishment of the buying entity's buyer account, HTTP server 112 sends, to the buying entity's HTTP client, instructions that tell the buying entity to tell selling entities to access a specified uniform resource locator (URL). The instructions may tell the buying entity to record, on the buying entity's voicemail, a message that tells selling entities to access the specified URL instead of soliciting the buying entity over the phone. The instructions may suggest one or more voice scripts that the buying entity may use in order to tell selling entities to access the specified URL. The instructions may tell the buying entity to forward, to a specified e-mail address, e-mail messages that the buying entity receives from selling entities.

In block 410, a request for one or more e-mail addresses is sent to the buying entity. For example, HTTP server 112 may send, to HTTP client 106A, a request for buyer attributes, those attributes including one or more of the buying entity's e-mail addresses. In block 412, one or more e-mail addresses are received from the buying entity. For example, HTTP server 112 may receive, from HTTP client 106A, buyer attributes, including one or more e-mail addresses of user 120A. In block 414, associations are established between the username and the e-mail addresses. For example, database server 114 may establish, in database 116, association between the username and the buyer attributes, including the one or more e-mail addresses.

In block 416, a first e-mail message, which was sent to a buying entity from a selling entity, is received from the buying entity. For example, e-mail client 118 may receive an e-mail message that was forwarded by e-mail client 108A. The e-mail message may be an e-mail message that was originally sent to an e-mail address of user 120A by e-mail client 108B. The e-mail message may contain an offer or advertisement for products or services offered by user 120B. The e-mail message may indicate an original origin e-mail address of user 120B. In block 418, the selling entity's e-mail address is determined from the first e-mail message. For example, a program resident on server device 110 may search the e-mail message for an origin e-mail address that differs from the e-mail address of user 120A. The determined e-mail address may be the e-mail address of user 120B.

In block 420, a second e-mail message is sent to the selling entity. For example, e-mail client 118 may send an e-mail message that is addressed to the e-mail address of user 120B, which was determined in block 418. The e-mail message may inform user 120B that user 120A only acknowledges solicitations that are sent through a specified website. The e-mail message may inform user 120B about how to access the specified website and establish a seller account. The e-mail message may provide a link that, when activated, causes an HTTP client to send a request to HTTP server 112.

According to one embodiment of the invention, the e-mail message sent to the selling entity does not contain any machine-searchable text that identifies an e-mail address to which the first e-mail was sent. This prevents selling entities from using e-mail messages received from server device 110 to automatically generate lists of verified e-mail addresses. For example, instead of containing machine-searchable text that identifies the buying entity's e-mail address, the e-mail message may contain an image (e.g., OF or JPEG) that visually indicates the buying entity's e-mail address. This allows a human being to recognize the buying entity's e-mail address while preventing automated programs from automatically gleaning the buying entity's e-mail address from the e-mail message.

In block 422, a request to establish a seller account is received from the selling entity. For example, HTTP server 112 may receive, from HTTP client 106B, a request to establish a seller account for user 120B. After the selling entity has established a seller account, the selling entity can direct solicitations to the buying entity through server device 110. The buying entity may review such solicitations on the buying entity's terms rather than on the selling entity's terms.

Figure 5:
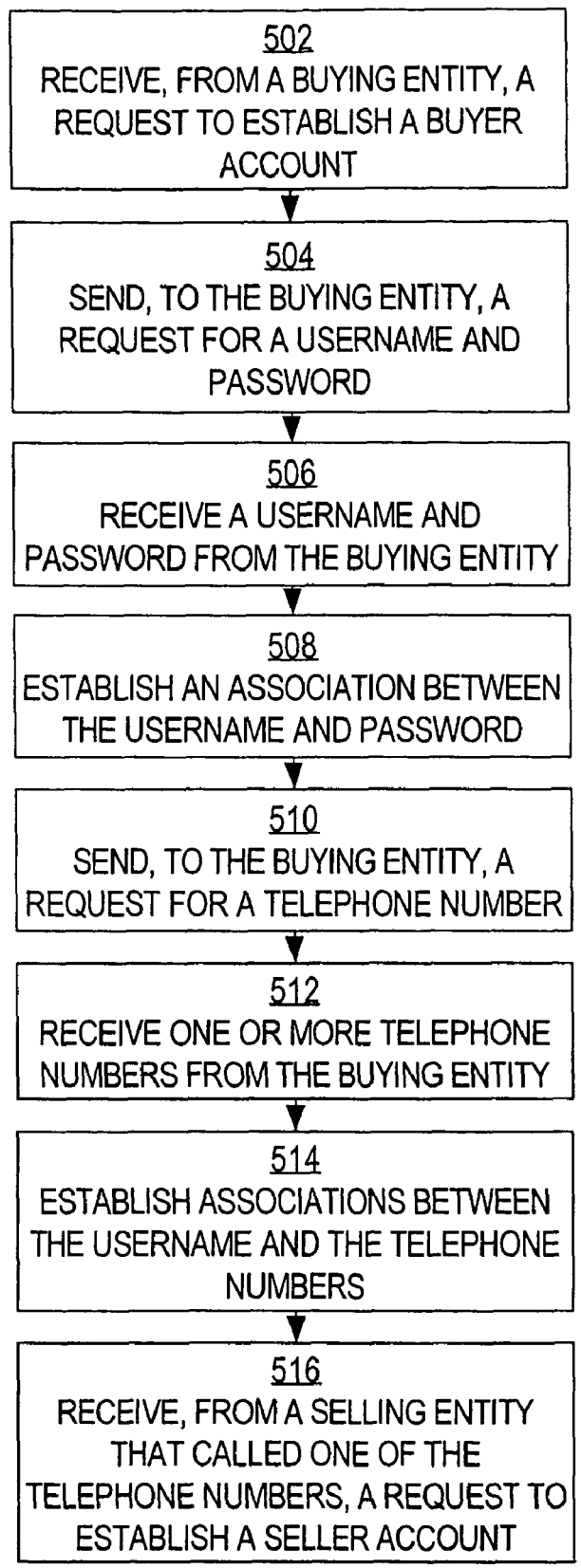
FIG. 5 is a flow diagram that depicts a technique for redirecting telephone solicitations, in accordance with an embodiment of the invention.

FIG. 5 is a flow diagram that depicts a technique for redirecting telephone solicitations, in accordance with an embodiment of the invention. The approach depicted in FIG. 5 may be implemented, for example, by server device 110.

In block 502, a request to establish a buyer account is received from a buying entity. In block 504, a request for a username and password is sent to the buying entity. In block 506, a username and password is received from the buying entity. In block 508, an association is established between the username and the password.

In block 510, a request for one or more telephone numbers is sent to the buying entity. For example, HTTP server 112 may send, to HTTP client 106A, a request for buyer attributes, those attributes including one or more telephone numbers. In block 512, one or more telephone numbers are received from the buying entity. For example, HTTP server 112 may receive, from HTTP client 106A, buyer attributes, including one or more telephone numbers of user 120A. In block 514, associations are established between the username and the one or more telephone numbers. For example, database server 114 may establish, in database 116, an association between the username and the buyer attributes, including the one or more telephone numbers.

Subsequently, when user 120A receives a phone call from a selling entity, user 120A may inform the selling entity that user 120A only acknowledges solicitations that are sent through a specified website. User 120A may convey, to the selling entity, via voice, voicemail, or proxy, a Uniform Resource Locator (URL) of the specified website. For example, if user 120A receives a phone call from user 120B, then user 120A may tell user 120B to direct the latter's browser to "www dot myhandshake dot com" instead of calling user 120A. User 120A may then terminate the phone call.

In block 516, a request to establish a seller account is received from a selling entity. For example, HTTP server 112 may receive, from HTTP client 106B, a request to establish a seller account for user 120B. After the selling entity has established a seller account, the selling entity can direct solicitations to the buying entity through server device 110. The buying entity may review such solicitations on the buying entity's terms rather than on the selling entity's terms.

IV. Targeting Solicitations

According to one embodiment of the invention, when a selling entity establishes a seller account with server device 110, the selling entity supplies information about the selling entity to server device 110. Such information is included in the selling entity's "seller attributes." Once a selling entity has established a seller account, the selling entity may initiate one or more "profiled campaigns." For each such profiled campaign, the selling entity may specify, to server device 110, (a) one or more product offers and (b) one or more criteria that buying entities' buyer attributes need to satisfy for the one or more product offers to be sent to those buying entities. In this manner, a selling entity can generate different profiles for different kinds of buying entities, and associate one or more separate customized product offers with each profile. Additionally or alternatively, a selling entity may generate an "individual campaign" by submitting, to server device 110, both a product offer and known information about an individual buying entity. Such known information may include a buying entity's telephone number, a buying entity's e-mail address, and/or a buying entity's username, as stored in database 116. Using such known information, server device 110 may determine which buying entity is associated with the known information in database 116, and direct the product offer to that buying entity's list of selling entity solicitations, as described below.

Each buying entity is associated with a separate list of selling entity solicitations. Once a campaign has been initiated, the campaign's associated product offers are placed in a list of selling entity solicitations of each buying entity whose buyer attributes satisfy the seller-specified criteria associated with the campaign. Product offers are called selling entity solicitations when placed within a buying entity's list of selling entity solicitations. Such selling entity solicitations are reviewed by buying entities on the buying entities' terms rather than the selling entity's terms. In this manner, a selling entity can target selling entity solicitations to the kinds of buying entities to which the selling entity wants to sell.

In one embodiment of the invention, when a selling entity establishes an account with server device 110, server device 110 requests, from the selling entity, information about how the selling entity was introduced to server device 110. For example, server device 110 may ask the selling entity whether the selling entity was referred to "www dot myhandshake dot com" as a consequence of the selling entity calling or e-mailing a buying entity. If the selling entity responds affirmatively, then server device 110 may ask the selling entity for an e-mail address and/or telephone number of that buying entity. If the selling entity supplies an e-mail address and/or telephone number of a particular buying entity, then server device 110 may determine, from associations established in database 116, which particular buying entity is associated with the seller-supplied e-mail address and/or telephone number.

Based on one or more group criteria previously specified by the particular buying entity, server device 110 may determine one or more other buying entities that are probably similar to the particular buying entity in the particular buying entity's opinion. Alternatively, server device 110 may determine one or more other buying entities based on other factors, such as, for example, whether the buying entities are associated with the same industry category. Server device 110 may suggest to the selling entity that the selling entity initiate a campaign in which a selling entity solicitation will be directed to the particular buying entity as well as other buying entities that are associated with buyer attributes that satisfy the particular buying entity's specified group criteria. Server device 110 may accomplish the above without revealing, to the selling entity, the identity or contact information of any buying entity. This helps prevent the selling entity from contacting buying entities through mechanisms other than those provided by system 100.

Figure 6A:
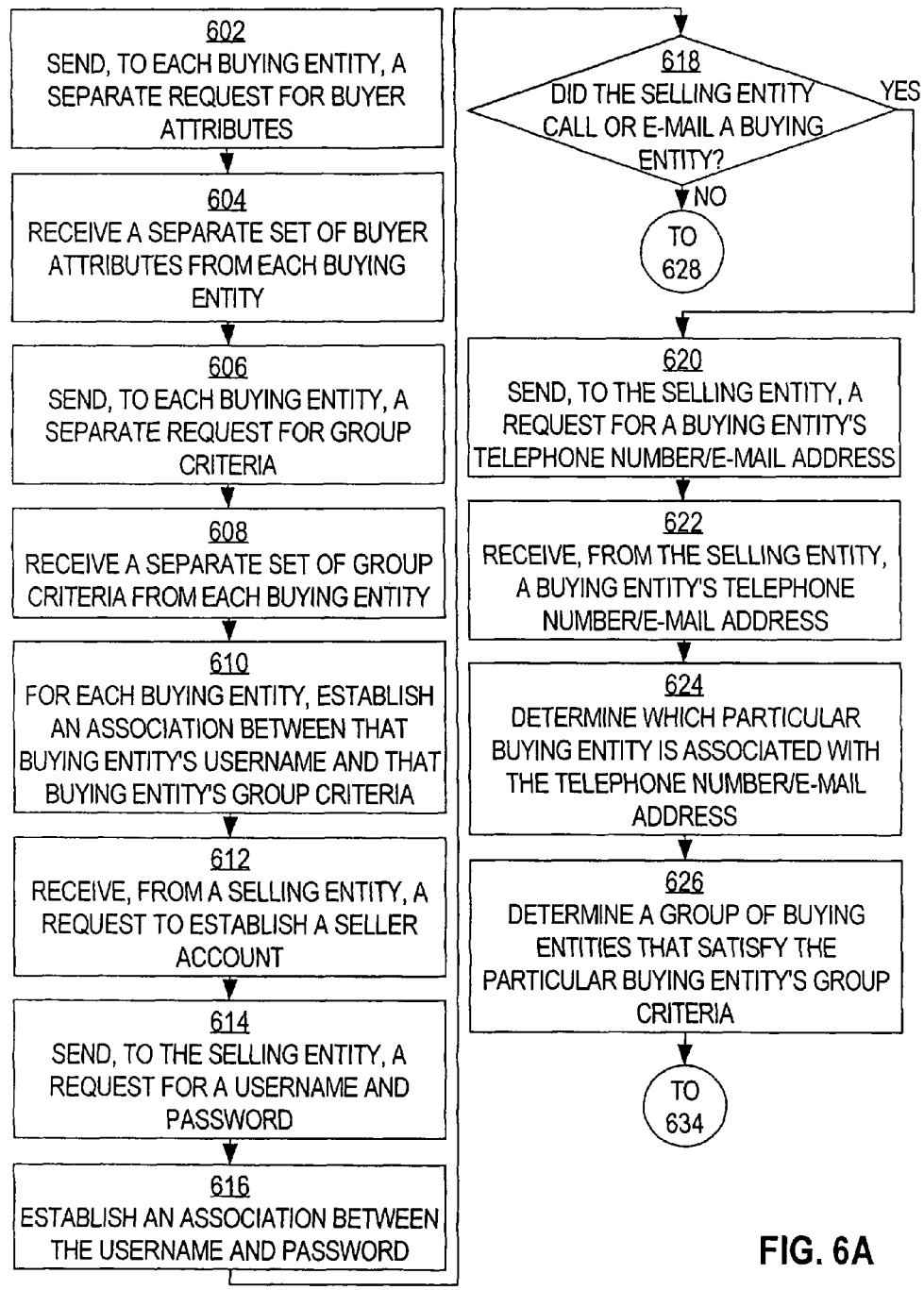
FIG. 6A and FIG. 6B are flow diagrams that depict a technique for targeting solicitations, in accordance with an embodiment of the invention.
Figure 6B:
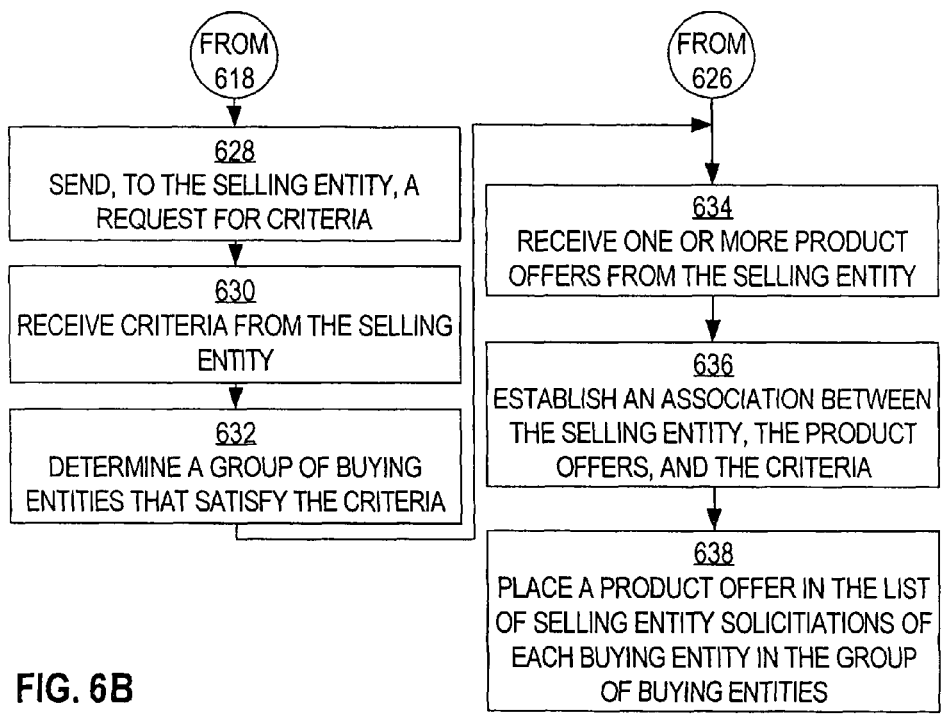

FIG. 6A and FIG. 6B are flow diagrams that depict a technique for targeting solicitations, in accordance with an embodiment of the invention. The approach depicted in FIG. 6A and FIG. 6B may be implemented, for example, by server device 110.

In block 602, for each buying entity of a plurality of buying entities, a separate request for buyer attributes is sent to that buying entity. For example, HTTP server 112 may send, to each of a plurality of HTTP clients, a separate request for buyer attributes. HTTP server 112 may send such requests to HTTP clients in response to those HTTP clients requesting the establishment of buyer accounts. For example, when HTTP server 112 receives, from HTTP client 106A, a request to establish a buyer account for user 120A, HTTP server 112 may responsively send, to HTTP client 106A, a request for buyer attributes of user 120A.

For example, buyer attributes may include a status attribute that indicates whether the buying entity is a profit or non-profit business entity, whether the buying entity does business in the public or private sector, whether the buying entity is self-employed, and/or whether the buying entity is a military or non-military government agency. Buyer attributes may include an industry attribute that indicates one or more industry categories into which the buying entity fits. Such industry categories may be selected from the North American Industrial Classification System (NAICS), for example. Buyer attributes may include a revenue attribute that indicates the buying entity's approximate yearly revenues. Buyer attributes may include a company size attribute that indicates an approximate number of employees that are employed by the buying entity. Buyer attributes may include a market share attribute that indicates the buying entity's approximate percentage share of the market in which the buying entity does business. Buyer attributes may include a location attribute that indicates the buying entity's geographic location.

Additionally, buyer attributes may include a title attribute that indicates the buying entity's title within a business organization (e.g., CEO, CFO, VP, director, manager/supervisor, etc.). Buyer attributes may include a subordinate attribute that indicates approximately how many employees are subordinate to the buying entity within the buying entity's business organization. Buyer attributes may include a budget attribute that indicates an approximate annual monetary budget over which the buying entity has control. Buyer attributes may include a duration attribute that indicates an approximate length of time with which the buying entity has been associated with his current business organization. Buyer attributes may include a personal signing authority attribute that indicates an approximate monetary expense amount that the buying entity is allowed to authorize personally.

Furthermore, buyer attributes may include a decision process attribute that indicates whether the buying entity participates in business decisions individually and/or as part of a committee, and whether those business decisions include purchasing decisions. Buyer attributes may include a buyer role attribute that indicates whether the buying entity makes purchasing decisions, whether the buying entity influences purchasing decisions made by others, whether the buying entity sponsors purchasing decisions made by others, and/or whether the buying entity implements purchasing decisions made by others.

The buyer attributes listed above are attributes that a selling entity might want to consider when deciding whether to target a buying entity for a seller-customized solicitation.

In block 604, for each buying entity of the plurality of buying entities, a separate set of buyer attributes are received from that buying entity. For example, HTTP server 112 may receive, from each of a plurality of HTTP clients, a separate set of buyer attributes. In block 606, for each buying entity of the plurality of buying entities, a separate association is established between that buying entity's username and that buying entity's buyer attributes. For example, database server 114 may establish, in database 116, a separate association between each buying entity's username and that buying entity's buyer attributes.

In block 606, for each buying entity of the plurality of buying entities, a separate request for group criteria is sent to that buying entity. For example, HTTP server 112 may send, to each of the plurality of HTTP clients, a separate request for group criteria. HTTP server 112 may send such requests to HTTP clients in response to those HTTP clients requesting the establishment of buyer accounts.

In block 608, for each buying entity of the plurality of buying entities, a separate set of group criteria are received from that buying entity. For example, HTTP server 112 may receive, from each of a plurality of HTTP clients, a separate set of group criteria. In block 610, for each buying entity of the plurality of buying entities, a separate association is established between that buying entity's username and that buying entity's group criteria. For example, database server 114 may establish, in database 116, a separate association between each buying entity's username and that buying entity's group criteria.

For example, a particular buying entity's group criteria may indicate one or more criteria that other buying entities' buyer attributes need to satisfy in order for those other buying entities to be considered by the particular buying entity to be similar to, or in the same group as, the particular buying entity. By defining group criteria, a particular buying entity defines a group that includes other buying entities which are, in the particular buying entity's opinion, similar to the particular buying entity. The buying entities that satisfy the group criteria may be referred to as the particular buying entity's "peer community." Server device 110 may constrain each buying entity's group criteria to include only criteria that the buying entity's own buyer attributes satisfy.

In block 612, a request to establish a seller account is received from a selling entity. For example, HTTP server 112 may receive, from HTTP client 106B, a request to establish a seller account for user 120B. In block 614, a request for a username and password is sent to the selling entity. For example, HTTP server 112 may send, to HTTP client 106B, a request for a username and password. In block 614, a username and password is received from the selling entity. For example, HTTP server 112 may receive, from HTTP client 106B, a username and password selected by user 120B. In block 616, an association is established between the username and the password. For example, database server 114 may establish, in database 116, an association between the username and password. As a result, a seller account is established in database 116.

In block 618, it is determined whether the selling entity was introduced to the system as a consequence of the selling entity calling or e-mailing a buying entity. For example, HTTP server 112 may send, to HTTP client 106B, a request for information about how the selling entity was introduced to "www dot myhandshake dot com." HTTP server 112 may receive, from HTTP client 106B, information that responsively indicates whether seller 120B was told, in a telephone conversation or an e-mail message, to direct HTTP client 106B to the URL. If the selling entity was introduced to the system as a consequence of the selling entity calling or e-mailing a buying entity, then control passes to block 620. Otherwise, control passes to block 628.

In block 620, a request for a buying entity's telephone number and/or e-mail address is sent to the selling entity. For example, HTTP server 112 may send, to HTTP client 106B, a request for a buying entity's telephone number and/or e-mail address. In block 622, a buying entity's telephone number and/or e-mail address is received from the selling entity. For example, assuming that user 120B previously had solicited user 120A via telephone or an e-mail message, and had been directed to the website as a result, HTTP server 112 may receive, from HTTP client 106B, the telephone number and/or e-mail address of user 120A.

In block 624, a particular buying entity associated with the telephone number and/or e-mail address is determined. For example, database server 114 may query database 116 for buying entities that are associated with the telephone number and/or e-mail address. In response to such a query, database server 114 may identify a particular buying entity that matches the telephone number and/or e-mail address.

In block 626, a group of buying entities that satisfy the particular buying entity's group criteria is determined. For example, database server 114 may query database 116 for buying entities that are associated with buyer attributes that satisfy the particular buying entity's group criteria. In response to such a query, database server 114 may identify a group of buying entities associated with buyer attributes that satisfy the particular buying entity's group criteria. Such a group includes the particular buying entity. In alternative embodiments of the invention, the group of buying entities may be determined based on other factors, such as, for example, whether the buying entities are associated with the same industry category. Control then passes to block 634.

Alternatively, in block 628, a request for one or more criteria is sent to the selling entity. For example, HTTP server 112 may send, to HTTP client 106B, a request for one or more criteria. In block 630, one or more criteria are received from the selling entity. For example, HTTP server 112 may receive, from HTTP client 106B, one or more criteria. The criteria define a buyer profile. In block 632, a group of buying entities that satisfy the criteria is determined. For example, database server 114 may query database 116 for buying entities that are associated with buyer attributes that satisfy the criteria. In response to such a query, database server 114 may identify a group of buying entities associated with buyer attributes that satisfy the criteria. Control then passes to block 634.

In block 634, one or more product offers are received from the selling entity. For example, HTTP server 112 may receive, from HTTP client 106, one or more product offers, each of which includes an offer or advertisement for products or services offered by user 120B. The product offer may be customized based on the attributes of the group to which the product offer will be targeted. In block 636, an association is established between the selling entity, the product offer, and the criteria. The criteria may be, for example, the particular buying entity's group criteria used in block 626, or the seller-specified criteria used in block 632. Database server 114 may establish such an association in database 116. As a result, a "campaign," comprising the criteria, is associated with the selling entity along with the one or more product offers associated with the campaign.

In block 638, for each buying entity in the group of buying entities, one or more selling entity solicitations are placed in that buying entity's list of selling entity solicitations. The group may be, for example, the group determined in block 626 or the group determined in block 632. Each such selling entity solicitation comprises a product offer received in block 636. The buying entities may review the selling entity solicitations at their convenience.

A selling entity may be associated with multiple campaigns, each campaign comprising separate criteria, and each campaign being associated with one or more separate product offers. In one embodiment of the invention, when a buying entity establishes a new buyer account with server device 110, database server 114 determines whether the buying entity's buyer attributes satisfy the criteria of any campaign. If so, then, for each such campaign, a program resident on server device 110 places that campaign's associated product offers in the buying entity's list of selling entity solicitations. Thus, a particular campaign's associated product offers may be added to the list of selling entity solicitations of a buying entity that establishes a buyer account subsequent to the establishment of the particular campaign. In an alternative embodiment of the invention, selling entity solicitations are not automatically added to the lists of selling entity solicitations of buying entities whose buyer attributes are subsequently determined to satisfy a campaign's criteria. Instead, server device 110 may notify a selling entity about the existence of newly identified buying entities that satisfy an existing campaign's criteria, and to whom the existing campaign's associated product offers have not yet been sent. Thereafter, the selling entity may instruct server device 110 whether or not to place those product offers into the newly identified buying entity's lists of selling entity solicitations. In one embodiment of the invention, the selling entity is charged a fee in exchange for the placement of the selling entity's product offers into buying entities' lists of selling entity solicitations.

V. Ranking Solicitations

As is described above, each buying entity is associated with a separate list of selling entity solicitations, and selling entity solicitations from one or more selling entities may be placed in one or more buying entities' list of selling entity solicitations. A buying entity may be more interested in some selling entity solicitations and less interested in other selling entity solicitations. In one embodiment of the invention, to assist a buying entity in locating selling entity solicitations that are of the greatest interest to the buying entity, system 100 comprises a mechanism for ranking selling entity solicitations in the buying entity's list of selling entity solicitations according to selling entity filter criteria that are both specified by and associated with the buying entity. Each buying entity may be associated with a separate set of selling entity filter criteria.

According to one embodiment of the invention, a buying entity may specify, for each filter criterion in that buying entity's associated selling entity filter criteria, whether that filter criterion is a "hard" or a "soft" filter criterion. Selling entity solicitations from selling entities whose seller attributes do not satisfy a buying entity's hard filter criteria may be ranked in a manner that places those selling entity solicitations in a separate portion of that buying entity's list of selling entity solicitations, which only contains selling entity solicitations whose associated seller attributes did not satisfy one or more of that buying entity's hard filter criterion. Thus, a buying entity's list of selling entity solicitations may be separated into two different portions; a first portion containing selling entity solicitations whose associated seller attributes satisfied all of the buying entity's hard filter criterion, and a second portion containing selling entity solicitations whose associated seller attributes failed to satisfy at least one of the buying entity's hard filter criteria. Consequently, a hard filter criterion is a filter criterion that selling entity solicitations' associated seller attributes must satisfy in order for those selling entity solicitations to be placed in the first portion of the list of selling entity solicitations.

Figure 7:
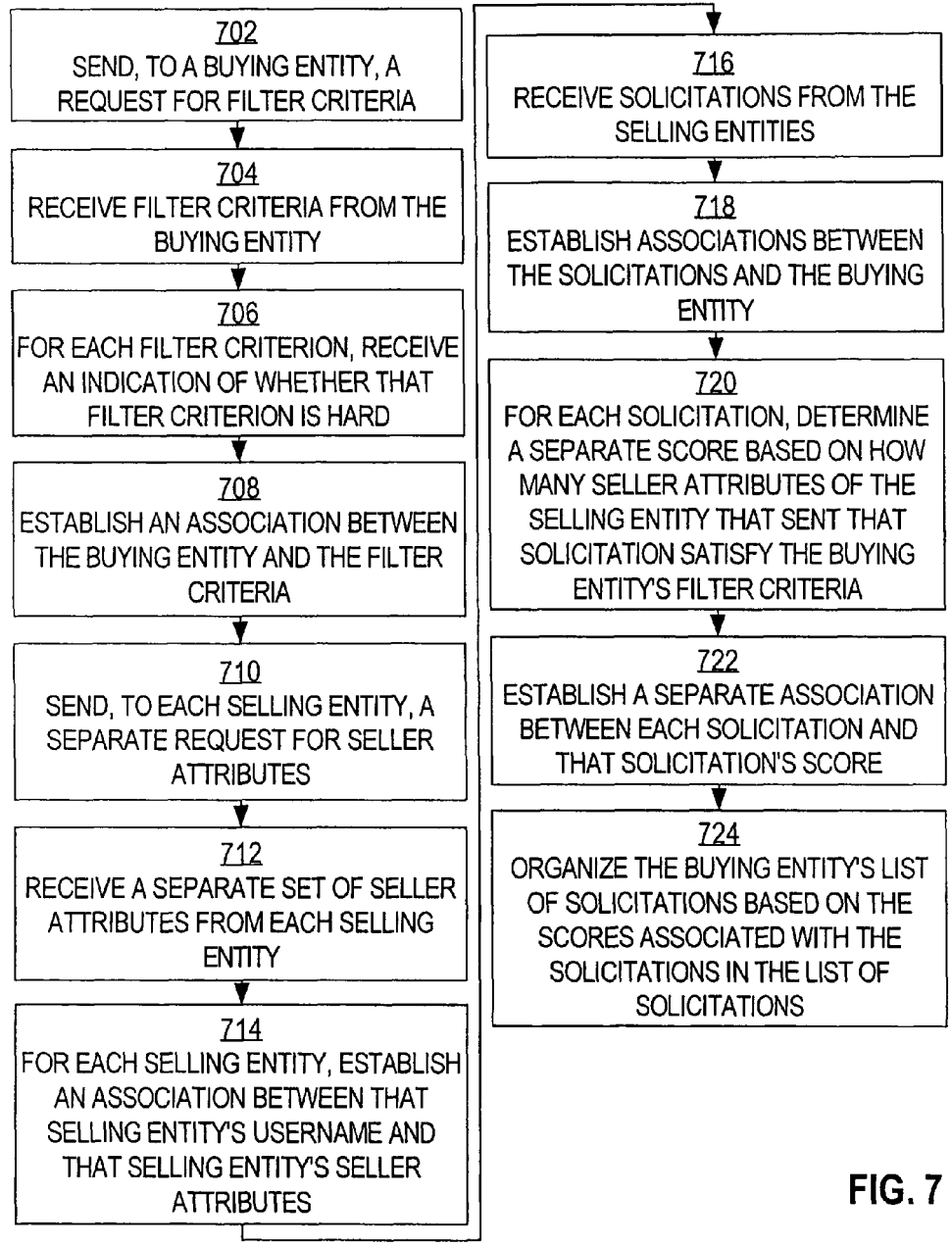
FIG. 7 is a flow diagram that depicts a technique for ranking solicitations, in accordance with an embodiment of the invention.

FIG. 7 is a flow diagram that depicts a technique for ranking selling entity solicitations, in accordance with an embodiment of the invention. The approach depicted in FIG. 7 may be implemented, for example, by server device 110.

In block 702, a request for selling entity filter criteria is sent to the buying entity. For example, HTTP server 112 may send, to HTTP client 106A, a request for one or more selling entity filter criteria. In block 704, one or more selling entity filter criteria are received from the buying entity. For example, HTTP server 112 may receive, from HTTP client 106A, one or more selling entity filter criteria. In block 706, for each criterion of the one or more selling entity filter criteria, an indication of whether that filter criterion is a hard criterion is received. For example, HTTP server 112 may receive, with the one or more selling entity filter criteria, an indication of which of those selling entity filter criteria are hard filter criteria. In block 708, an association is established between the buying entity and the one or more selling entity filter criteria. For example, database server 114 may establish, in database 116, an association between the buying entity's username and the one or more selling entity filter criteria.

In block 710, for each selling entity of a plurality of selling entities, a separate request for seller attributes is sent to that selling entity. For example, HTTP server 112 may send, to each of a plurality of HTTP clients, a separate request for seller attributes. HTTP server 112 may send such requests to HTTP clients in response to those HTTP clients requesting the establishment of seller accounts. For example, when HTTP server 112 receives, from HTTP client 106B, a request to establish a seller account for user 120B, HTTP server 112 may responsively send, to HTTP client 106B, a request for seller attributes of user 120B.

For example, seller attributes may include an industry attribute that indicates one or more industry categories into which the selling entity fits. Such industry categories may be selected from the NAICS, for example. In one embodiment of the invention, the selling entity may be charged a fee for each industry category that the selling entity's seller attributes indicate. Seller attributes may include a company age attribute that indicates a number of years that the selling entity's business organization has existed. Seller attributes may include a company revenue attribute that indicates the annual revenues of the selling entity's business organization. Seller attributes may include a company size attribute that indicates a number of employees that are employed by the selling entity's business organization. In addition, seller attributes may include one or more product attributes, each of which indicates one or more product categories into which a separate one of the selling entity's products or services fits. Such product categories may be selected from the Open Directory Project (ODP), for example.

Additionally, seller attributes may a include a status attribute that indicates whether the selling entity is a profit or non-profit business entity, whether the selling entity does business in the public or private sector, whether the selling entity is self-employed, and/or whether the selling entity is a military or non-military government agency. Seller attributes may include an origin country attribute that indicates a nation with which the selling entity is associated (e.g., by incorporation therein or by having a principal place of business therein). Seller attributes may include a certification attribute that indicates one or more certifications that the selling entity has obtained (e.g., ISO 9000, ISO 14000, etc.). Seller attributes may include a customer attribute that indicates the identities of one or more other business organization with which the selling entity does business. Seller attributes may include a customer proportion attribute that indicates, for one or more other business organization, how much of the selling entity's business is attributable to each of those business organizations.

Furthermore, seller attributes may include a support locations attribute that indicates one or more geographic locations in which the selling entity offers customer support. Seller attributes may include a resources attribute that indicates whether the selling entity can provide a product or service demonstration, whether the selling entity can arrange peer-to-peer executive meetings, whether the selling entity provides a no-obligation consultation, and/or whether the selling entity offers full-service implementation.

The seller attributes listed above are attributes that a buying entity might want to consider when deciding whether to further investigate a selling entity's solicitations.

In block 712, for each selling entity of the plurality of selling entities, a separate set of seller attributes are received from that selling entity. For example, HTTP server 112 may receive, from each of a plurality of HTTP clients, a separate set of seller attributes. In block 714, for each selling entity of the plurality of selling entities, a separate association is established between that selling entity's username and that selling entity's seller attributes. For example, database server 114 may establish, in database 116, a separate association between each selling entity's username and that selling entity's seller attributes.

In block 716, one or more selling entity solicitations are received from one or more selling entities. For example, HTTP server 112 may receive, from each of a plurality of HTTP clients, a separate set of campaigns, with each campaign comprising a separate solicitation. In block 718, for each of the one or more selling entity solicitations, a separate association is established between that selling entity solicitation and the buying entity. For example, for each selling entity solicitation directed to a particular buying entity, database server 114 may establish an association between that selling entity solicitation and the particular buying entity. In this manner, selling entity solicitations may be placed in a buying entity's list of selling entity solicitations.

In block 720, for each of the one or more selling entity solicitations, a separate score is determined based on how many of the seller attributes of the selling entity that sent that selling entity solicitation satisfy the buying entity's selling entity filter criteria. For example, a program resident on server device 110 may determine, for each selling entity solicitation, a separate score based on the buying entity's selling entity filter criteria. According to one embodiment of the invention, if any of a selling entity's seller attributes fail to satisfy at least one of the buying entity's hard filter criteria, then that selling entity's solicitations are placed in a portion of the buying entity's list of selling entity solicitations that only contains selling entity solicitations sent by selling entities whose seller attributes failed to satisfy at least one of the buying entity's hard filter criteria.

In block 722, for each of the one or more selling entity solicitations, an association is established between that selling entity solicitation and the score determined for that selling entity solicitation. For example, database server 114 may establish such associations in database 116. Because different buying entities may be associated with different selling entity filter criteria, a selling entity solicitation may be associated with one score when placed in one buying entity's list of selling entity solicitations, and another score when placed in another buying entity's list of selling entity solicitations. Thus, in database 116, a particular selling entity solicitation may be associated with multiple buying entity-and-score pairs.

In block 724, the buying entity's list of selling entity solicitations is organized based on the scores associated with the selling entity solicitations in the list of selling entity solicitations. For example, database server 114 may sort a buying entity's associated selling entity solicitations by score, thereby producing a sorted list of selling entity solicitations for the buying entity. The buying entity may review the buying entity's sorted list of selling entity solicitations at the buying entity's convenience. Selling entity solicitations from selling entities whose seller attributes satisfy most of the buying entity's selling entity filter criteria appear towards the top of the buying entity's list of selling entity solicitations when the buying entity reviews the list of selling entity solicitations. The entire content of the selling entity solicitation does not need to be displayed in the list; by activating a link associated with a selected selling entity solicitation, the buying entity can view detailed contents of the selling entity solicitation. The detailed contents may indicate the seller attributes of the selling entity that sent the selling entity solicitation, and, for each such seller attribute, whether that seller attribute satisfied that buying entity's filter criteria. In one embodiment of the invention, the list of selling entity solicitations is not necessarily ordered. In one embodiment of the invention, the scores associated with the selling entity solicitations are sent in addition to the selling entity solicitations, and are indicated in the buying entity's list of selling entity solicitations.

VI. Notification Preferences

As is described above, buying entities may review their list of selling entity solicitations on the buying entities' terms rather than the selling entities' terms. Thus, in one embodiment of the invention, a buying entity is not necessarily notified every time that a new selling entity solicitation has been placed in that buying entity's list of selling entity solicitations. Instead, in one embodiment of the invention, each buying entity may specify separate notification preferences. For example, notification preferences may be requested and received by HTTP server 112. When notification preferences are received from a buying entity, database server 114 establishes an association between that buying entity's username and those notification preferences.

For example, notification preferences may indicate a frequency at which a buying entity wishes to be notified about whether any new selling entity solicitations have been placed in the buying entity's list of selling entity solicitations. At the specified frequency (e.g., once per day), a program resident on server device 110 may determine whether any selling entity solicitations have been added to the buying entity's list of selling entity solicitations since the last time that the buying entity reviewed the list of selling entity solicitations. If selling entity solicitations have been added since the last time, then server device 110 may generate a notification and send the notification to the buying entity.

For example, e-mail client 118 may generate an e-mail message that indicates that new selling entity solicitations have been added to a buying entity's list of selling entity solicitations since the last time that the buying entity reviewed the list of selling entity solicitations. Optionally, the e-mail message may indicate a number of such new selling entity solicitations, and/or the last time that the buying entity reviewed the list of selling entity solicitations. In one embodiment of the invention, the e-mail message contains a link that, when activated, causes the buying entity's browser (e.g., HTTP client 106A) to be directed to a page that indicates the buying entity's sorted list of selling entity solicitations. In the sorted list of selling entity solicitations, new selling entity solicitations may be visibly distinguished from selling entity solicitations that were already in the buying entity's list of selling entity solicitations at the last time that the buying entity received the list of selling entity solicitations.

E-mail client 118 may send such an e-mail message to an e-mail address that is associated, in database 116, with the buying entity's username. An e-mail client resident on a client device may receive the e-mail message and display the contents of the e-mail message to a buying entity.

Whenever a list of selling entity solicitations is sent to a buying entity's HTTP client, database server 114 may establish, in database 116, an association between the buying entity's username and a time at which the list of selling entity solicitations was most recently sent. Each selling entity solicitation may be associated with a timestamp that indicates a time at which the selling entity solicitation was added to a particular list of selling entity solicitations. By comparing selling entity solicitations' timestamps with the time at which a list of selling entity solicitations was last sent, programs resident on server device 110 may determine which selling entity solicitations are new to a particular buying entity's list of selling entity solicitations.

VII. Acting on Solicitations

According to one embodiment of the invention, at a buying entity's request, a program resident on server device 110 dynamically generates, and sends to the buying entity's HTTP client, a page that contains the buying entity's list of selling entity solicitations, ordered by the scores associated with each selling entity solicitation therein. The page also may contain, next to each such selling entity solicitation, one or more controls that, when activated, cause indicated actions to be performed relative to that selling entity solicitation. For example, next to each selling entity solicitation, the page may display button controls labeled "invite seller," "forward," "question seller," "delete," "get referral," and "improve filters."

A user may activate these controls using an HTTP client. In one embodiment of the invention, a buying entity's activation of the "invite seller" control causes an invitation to be sent to the selling entity that sent the selling entity solicitation associated with the activated "invite seller" control. For example, e-mail client 118 may generate an e-mail message and send the e-mail message to an e-mail address associated with the selling entity's username in database 116. The e-mail message may inform the selling entity that the buying entity is interested in receiving further contact from the selling entity. In one embodiment of the invention, the e-mail message indicates contact information for the buying entity. The contact information may indicate the buying entity's identity. The selling entity may use the contact information to contact the buying entity through mechanisms other than those provided by system 100.

In one embodiment of the invention, after such an invitation has been sent, the buying entity and the selling entity may be given one or more opportunities to rate each other. Such ratings may be requested and received by HTTP server 112. When a rating for a selling entity is received from a buying entity, an association is established, in database 116, between the selling entity, the rating, and the buying entity that sent the rating. Similarly, when a rating for a buying entity is received from a selling entity, an association is established, in database 116, between the buying entity, the rating, and the selling entity that sent the rating. Ratings may be numerical values within a specified range.

In one embodiment of the invention, buying entities and selling entities can request and receive each other's overall and detailed ratings. For example, if five ratings of a selling entity have been received from five different buying entities, then, in response to a buying entity's request, the average of the five ratings may be determined and sent to the buying entity. Buying entities and selling entities can consider such ratings when deciding whether to do business with each other. Both buying entities and selling entities may be associated with overall and detailed ratings in database 116.

As is described above, in one embodiment of the invention, a buying entity may define a group of buying entities by specifying one or more group criteria. Group criteria specified by a buying entity are associated with that buying entity's username in database 116. In one embodiment of the invention, a particular buying entity may request a group rating for a specified selling entity. In order to determine the group rating, a group of buying entities is determined based on the particular buying entity's group criteria. The group contains only those buying entities that are associated with buyer attributes that satisfy the particular buying entity's group criteria. Ratings of the selling entity, submitted by buying entities within the group, are averaged. The resulting group rating of the selling entity may be sent to the particular buying entity. A selling entity's overall rating may be higher or lower than the selling entity's average rating by a narrower group of buying entities.

In one embodiment of the invention, a first buying entity's activation of the "forward" control causes the particular selling entity solicitation associated with the activated "forward" control to be placed in a second buying entity's list of selling entity solicitations. Using an HTTP client, the first buying entity may specify the identity of the second buying entity. HTTP server 112 may receive the identity of the second buying entity from the first buying entity's HTTP client. Database server 114 may cause the particular selling entity solicitation to be associated with the second buying entity's list of selling entity solicitations. As is described above, the second buying entity may be associated with different selling entity filter criteria than the first buying entity. Therefore, when selling entity solicitations in the second buying entity's list of selling entity solicitations are scored and ranked, the particular selling entity solicitation may be associated with a different score than the score with which the particular selling entity solicitation was associated in the first buying entity's list of selling entity solicitations. The second buying entity may review the second buying entity's ordered list of selling entity solicitations, including the particular selling entity solicitation, at the second buying entity's convenience.

In one embodiment of the invention, a buying entity's activation of the "question seller" control causes a buying entity-specified question to be sent to the selling entity that sent the selling entity solicitation associated with the activated "question seller" control. According to one embodiment of the invention, the buying entity's identity is not revealed to the selling entity when the question is sent to the selling entity. In one embodiment of the invention, the buying entity specifies which of the buying entity's buyer attributes may be revealed to the selling entity when the question is sent to the selling entity. The selling entity may send an answer to the buying entity, even without knowing the buying entity's identity, through a mechanism provided by system 100. For example, after activating a "question seller" control associated with a selling entity solicitation, user 120A may specify a question using HTTP client 106A. HTTP client 106A may send the question, along with an identifier of the selling entity solicitation, to HTTP server 112A. Database server 114 may query database 116 to determine the selling entity associated with the selling entity solicitation identifier. E-mail client 118 may generate a first e-mail message that contains the question, and send the first e-mail message to an e-mail address that is associated with the selling entity's username in database 116. In one embodiment of the invention, the first e-mail message does not reveal the identity or e-mail address of the buying entity. Assuming that the selling entity is user 120B, for example, the first e-mail message may be received by e-mail client 108B. User 120B may use e-mail client 108B to compose a second, reply e-mail message that contains an answer to the question. E-mail client 108B may send the second e-mail message to the e-mail address from which the first e-mail message was sent. E-mail client 118 may receive the second e-mail message and forward the second e-mail message to an e-mail address that is associated with the buying entity's username in database 116. E-mail client 108A may receive the second e-mail message and display the answer to user 120A.

In one embodiment of the invention, a buying entity's activation of the "delete" control causes the selling entity solicitation associated with the activated "delete" control to be removed from the buying entity's list of selling entity solicitations. Selling entities that sent selling entity solicitations removed in this manner become "prior solicitors" associated with the buying entity. Each buying entity may be associated with a separate set of prior solicitors. As is described above, a selling entity's seller attributes may include an industry attribute that indicates one or more industry categories into which the selling entity fits, and one or more product attributes that indicate one or more product categories into which the selling entity's products and/or services fit. In one embodiment of the invention, a buying entity can search for selling entities by specified industry categories and/or specified product categories. In response to such a search, server device 110 sends, to the buying entity's HTTP client, a result list of selling entities whose seller attributes match the buying entity-specified industry and/or product categories. In the result list, selling entities that are prior solicitors relative to the buying entity are distinguished from selling entities whose selling entity solicitations have never been placed in the buying entity's list of selling entity solicitations. In the result list, a date on which prior solicitors sent selling entity solicitations to the buying entity may be indicated.

In one embodiment of the invention, a buying entity can save specified industry categories and/or specified product categories as a "search agent" of that buying entity. When such a search agent is established, server device 110 notifies the buying entity about the existence of new selling entities that are associated with seller attributes that match the specified industry categories and/or product categories subsequent to the establishment of the search agent.

For example, in response to the activation of a "delete" control associated with a particular selling entity solicitation, HTTP client 106A may send, to HTTP server 112, information indicating the identity of the particular selling entity solicitation. Database server 114 may establish an association, in database 116, between the buying entity that activated the control and the selling entity that sent the selling entity solicitation. As a result, the selling entity is established as a prior solicitor of the buying entity. Additionally, database server 114 may remove an association, in database 116, between the selling entity solicitation and the list of selling entity solicitations of the buying entity. As a result, the selling entity solicitation is no longer contained in the buying entity's list of selling entity solicitations.

In one embodiment of the invention, a particular buying entity's activation of a "get referral" control associated with a selling entity solicitation causes the identities of one or more other buying entities to be sent to the particular buying entity's HTTP client. The other buying entities are those that have agreed to serve as referrals for the selling entity that sent the selling entity solicitation. For example, a selling entity may ask one or more other users to serve as referrals for the selling entity. The selling entity may instruct the other users to establish buyer accounts with server device 110. Those users that do establish buyer accounts may be presented with the option of specifying one or more selling entities for which those users are willing to serve as referrals. In one embodiment of the invention, when a buying entity specifies a selling entity for which he will serve as a referral, database server 114 establishes an association, in database 116, between that buying entity and the referral list of the selling entity. HTTP server 112 may send the contents of a selling entity's referral list to a buying entity in response to a request from the buying entity.

In one embodiment of the invention, a buying entity's activation of an "improve filters" control associated with a selling entity solicitation causes a list of the buying entity's associated selling entity filter criteria to be sent to the buying entity. For each filter criterion in the selling entity filter criteria, the list indicates whether the selling entity solicitation satisfied that filter criterion. Based on the information represented in the list, the buying entity may add or remove selling entity filter criteria from the buying entity's associated selling entity filter criteria. In this manner, a buying entity can customize its selling entity filter criteria so that, in the future, similar selling entity solicitations will be scored higher or lower. After the adjusted selling entity filter criteria have been associated with the buying entity in database 116, selling entity solicitations in the buying entity's list of selling entity solicitations may be re-scored according to the adjusted selling entity filter criteria. The buying entity's list of selling entity solicitations, organized according to the new scores, may be sent to the buying entity's HTTP client.

VIII. Needcasts™ and Agents

In one embodiment of the invention, system 100 includes a mechanism that allows a buying entity to generate Needcasts™ that are sent to multiple selling entities. A Needcast™ identifies a buying entity's need, and invites recipient selling entities to respond to the Needcast™ if those selling entities are able to fulfill the need. In one embodiment of the invention, system 100 includes a mechanism that allows a selling entity to generate "agents" that filter Needcasts™ based on whether the selling entity is likely to be able to fulfill the needs specified in those Needcasts™. An agent ignores Needcasts™ that do not satisfy selling entity-specified criteria, and presents, to the selling entity, only Needcasts™ that satisfy the selling entity-specified criteria.

Figure 8:
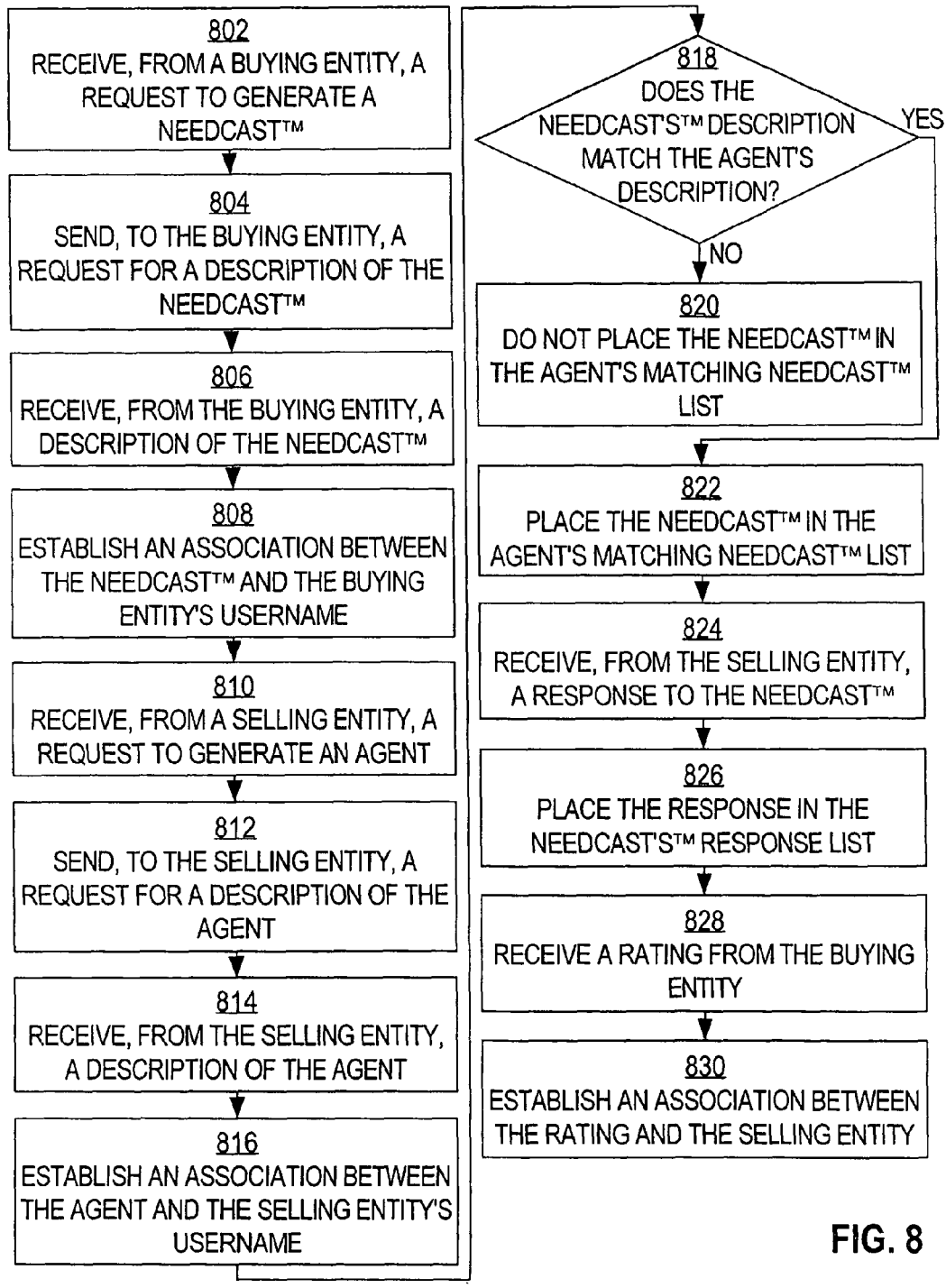
FIG. 8 is a flow diagram that depicts a technique for broadcasting buyer needs, in accordance with an embodiment of the invention.

FIG. 8 is a flow diagram that depicts a technique for broadcasting buyer needs, in accordance with an embodiment of the invention. The approach depicted in FIG. 8 may be implemented, for example, by server device 110.

In block 802, a request to generate a Needcast™ is received from a buying entity. For example, HTTP server 112 may receive, from HTTP client 106A, a request to generate a Needcast™ for user 120A. In block 804, a request for a description of the Needcast™ is sent to the buying entity. For example, HTTP server 112 may send, to HTTP client 106A, a request for a description of the Needcast™. In block 806, a description of the Needcast™ is received from the buying entity. For example, HTTP server 112 may receive, from HTTP client 106A, a description of the Needcast™ by user 120A. In block 808, an association is established between the Needcast™ and the buying entity's username. For example, database server 114 may establish, in database 116, an association between the Needcast™, including the description, and the buying entity's username. A buying entity may generate multiple different Needcasts™ in this manner. In one embodiment of the invention, Needcasts™ do not identify the identities of the buying entities that generated those Needcasts™. This helps prevent selling entities from soliciting buying entities using mechanisms outside of those provided by system 100.

The request for the description of the Needcast™ may include a request for multiple separate information items. For example, such information items may include a Needcast™ name, a general description of the buying entity's need, a list of desired deliverables, a list of companies that may be able to fulfill the need, a list of positive keywords, a list of negative keywords, a selection of one or more categories into which the need fits, a selection of one or more categories that indicate a reason for the Needcast™, an indication of the urgency of the need, and/or a selection of one or more categories that describe the buying entity's role in relation to the Needcast™ (e.g., end user, sponsor for adoption, decision influencer, decision maker, etc.). The description of the Needcast™ may include one or more of these and/or other information items. The information items received from the buying entity may be stored in association with the Needcast™.

In one embodiment of the invention, the selection of categories into which the need fits may include categories such as assets, career, environment, knowledge/information, legal, money, people, relationships, soft values, time, tangible, intangible, other, etc. In one embodiment of the invention, the categories are organized into a hierarchical taxonomy of need categories, where each need category may be a parent of one or more need subcategories, each of those subcategories may be a parent of one or more further subcategories, and so on, through multiple levels. In one embodiment of the invention, the need categories and subcategories do not include specific products and/or services. Using the hierarchical taxonomy, a buying entity may select, from among multiple broad need categories, a broad need category into which the buying entity's need fits. In the hierarchical taxonomy, the selected broad need category may be parent to multiple narrower need subcategories. The buying entity may select, from among the narrower subcategories of the selected broad need category, a particular narrower need subcategory into which the buying entity's need fits. The selected narrower need subcategory may be parent to multiple further need subcategories. In this manner, a buying entity may iteratively narrow the need categories into which the buying entity's need fits, until the buying entity has selected a branch of the hierarchical taxonomy that accurately and specifically describes the buying entity's need. A particular need category may appear in multiple branches of the hierarchical taxonomy.

In one embodiment of the invention, positive and negative keywords signal to a selling entity whether that selling entity should respond to a Needcast™. A selling entity may see the positive and negative keywords associated with a Needcast™. As a result, selling entities that are involved in activities associated with a negative keyword are warned to not respond to Needcasts™ that contain that negative keyword. Conversely, selling entities that are involved in activities associated with a positive keyword are encouraged to respond to Needcasts™ that contain the positive keyword.

In block 810, a request to generate an agent is received from a selling entity. For example, HTTP server 112 may receive, from HTTP client 106B, a request to generate an agent for user 120B. In block 812, a request for a description of the agent is sent to the selling entity. For example, HTTP server 112 may send, to HTTP client 106B, a request for a description of the agent. In block 814, a description of the agent is received from the selling entity. For example, HTTP server 112 may receive, from HTTP client 106A, a description of the agent by user 120B. In block 816, an association is established between the agent and the selling entity's username. For example, database server 114 may establish, in database 116, an association between the agent, including the description, and the selling entity's username. A selling entity may generate multiple different agents in this manner.

Like the request for a description of a Needcast™, the request for the description of an agent may include a request for multiple separate information items. Such information items may include one or more of the information items, listed above, which are requested in a description of a Needcast™.

In block 818, it is determined whether the Needcast's™ description matches the agent's description. For example, a program resident on server device 110 may compare the Needcast's™ selection of categories with the agent's selection of categories. Comparisons may be made between each Needcast™ and each agent. Comparisons may be made whenever a new Needcast™ or a new agent is generated. In one embodiment of the invention, if a Needcast's™ selection of categories matches an agent's selection of categories, then the Needcast's™ description matches the agent's description. If the Needcast's™ description matches the agent's description, then control passes to block 822. Otherwise, control passes to block 820.

Each agent may be associated with a separate matching Needcast™ list that contains Needcasts™ having descriptions that match that agent's description. In block 820, the Needcast™ is not placed in the agent's matching Needcast™ list.

Alternatively, in block 822, the Needcast™ is placed in the agent's matching Needcast™ list. This may be accomplished, for example, by establishing an association, in database 116, between the Needcast™ and the agent. At the selling entity's convenience, the selling entity may request, from server device 110, Needcasts™ that are contained in a specified agent's matching Needcast™ list. In one embodiment of the invention, the selling entity may view the description of each such Needcast™, but not the identity of the buying entity that sent that Needcast™. Based on a Needcast's™ description, the selling entity may decide to respond to the Needcast™. The selling entity may be informed that responding to a Needcast™ gives a buying entity an opportunity to rate the selling entity.

In block 824, if the selling entity decides to respond to the Needcast™, then a response to the Needcast™ is received from the selling entity. For example, HTTP server 112 may receive, from HTTP client 106B, a response to the Needcast™. The response may be structured similarly to a selling entity solicitation that is associated with a campaign. The selling entity may specify the content of the response.

Each Needcast™ may be associated with a separate "response list" that contains responses to that Needcast™. In block 826, the response to the Needcast™ is placed in the Needcast's™ response list. This may be accomplished, for example, by establishing an association, in database 116, between the response and the Needcast™. At the buying entity's convenience, the buying entity may request, from server device 110, responses that are contained in a specified Needcast's™ response list. The buying entity may view the content of each such response. Each such response is associated with the selling entity that sent that response.

Similar to the scoring and ranking of selling entity solicitations in a list of selling entity solicitations, in one embodiment of the invention, the responses in a Needcast's™ response list are scored according to how many seller attributes of the selling entities that sent those responses satisfy the buying entity's selling entity filter criteria. The responses are ranked and sorted by associated scores. Thus, the highest-scoring responses may be located toward the top of the response list, and the lowest-scoring responses may be located toward the bottom of the response list.

In one embodiment of the invention, a buying entity may specify a separate, customized set of selling entity filter criteria for each Needcast™. For example, the buying entity may specify a customized set of selling entity filter criteria at the time that the buying entity generates the Needcast™. If a customized set of selling entity filter criteria has been specified for a Needcast™, then that customized set may be associated with the Needcast™ in database 116. Responses to a Needcast™ that has been associated with a customized set of selling entity filter criteria may be scored and ranked according to the customized set of selling entity filter criteria instead of the buying entity's general selling entity filter criteria.

In block 828, if the buying entity decides to rate the selling entity, then a rating is received from the buying entity. For example, HTTP server 112 may receive, from HTTP client 106A, a rating that is based on the response to the Needcast™. In block 830, an association is established between the rating and the selling entity. The rating is considered with others of the selling entity's ratings when determining the selling entity's overall rating.

In one embodiment of the invention, if the buying entity is interested in the selling entity's response, then the buying entity may invite the selling entity to contact the buying entity. This may be accomplished in a manner similar to that described above with reference to a buying entity's activation of an "invite seller" control associated with a selling entity solicitation.

IX. Pipeline Phases and Ratings

In one embodiment of the invention, when a buying entity invites a selling entity to contact the buying entity, as described above, an association is established between the buying entity, the selling entity, and a phase. For example, the first phase after the invitation might be a "presentation" phase. In this manner, the buying entity and the selling entity enter a "pipeline." According to one embodiment of the invention, a buying entity and a selling entity may enter a pipeline as a result of any of several actions that may be taken by either the buying entity or the selling entity. For example, a buying entity and a selling entity may enter a pipeline as a result of the selling entity responding to the buying entity's Needcast™ For another example, a buying entity and a selling entity may enter a pipeline as a result of the buying entity directly requesting information from the selling entity. When the association between the buying entity and the selling entity has been established, a timer may be started. For example, the timer might be set to expire when a specified number of days have passed since the timer was started.

At the expiration of the timer, both the buying entity and the selling entity may be asked whether a specified event between the buyer and the seller took place. For example, in the "presentation" phase, HTTP server 112 may request, from the buying entity and the selling entity, information that indicates whether the selling entity made a presentation to the buying entity. If both entities respond affirmatively, then both are asked to submit a rating for the other's participation in the specified event. The submitted ratings may be associated with the buying and selling entities.

After the buying entity and the selling entity have (optionally) rated each other, both entities may be asked whether they wish to progress to a next phase. If both respond affirmatively, then the phase associated with the buying entity and the selling entity may be updated to become a subsequent phase in the pipeline. For example, an "investigation" phase may follow the "presentation" phase, and an "implementation" phase may follow the "investigation" phase.

For each phase, the above process may be repeated. Thus, in each phase, the buying entity and the selling entity may rate each other. In one embodiment of the invention, ratings submitted in later phases are weighted to affect an entity's overall rating more than ratings submitted in earlier phases.

In one embodiment of the invention, when a timer has expired, either the buying entity or the selling entity may request an extension of time from the other. If the other grants the request, then the timer may be re-started with a specified value. Thus, with the consent of both a buying entity and a selling entity, ratings for a particular phase may be deferred.

In one embodiment of the invention, a particular buying entity may specify one or more other buying entities to be "trusted friends" of the particular buying entity. Trusted friends of the particular buying entity are associated with the particular buying entity in database 116. Similarly, other buying entities may designate the particular buying entity to be a trusted friend of those other buying entities. In one embodiment of the invention, when a particular buying entity gives a sufficiently positive rating to a selling entity, the particular buying entities' trusted friends are notified that the positive rating was issued to the selling entity. This may encourage the trusted friends to do business with the selling entity.

In one embodiment of the invention, a first selling entity may request the buying entity's permission to have a second selling entity replace the first selling entity in the buying entity's pipeline. For example, during the "implementation" phase, a first selling entity may request the buying entity's permission to allow a second selling entity to replace the first selling entity. If the buying entity grants this permission, and if the second selling entity has previously indicated a willingness to be a delegate of the first selling entity, then the second selling entity takes the place of the first selling entity in the buying entity's pipeline. Both buying entities and selling entities may be associated, in database 116, with other entities as delegates of those other entities.

X. Ongoing Relationship Phase

Buying entities and selling entities may engage in a continuing relationship with each other using the system described above. As is discussed above, through this system-maintained relationship, buying entities and selling entities may proceed, with their mutual consent, through various phases of a multi-phase "pipeline." At each phase, buying and selling entities optionally may rate each other. In one embodiment of the invention, these phases comprise, in order, an "information-gathering" phase, a "presentation" phase, an "investigation" phase, an "implementation" phase, and an "ongoing relationship" phase.

An ongoing relationship phase may be important to a buying entity for several reasons. After a buying entity has purchased a selling entity's products or services, and after the selling entity has supplied the purchased products or services to the buying entity, the buying entity may experience some dissatisfaction with those products or services. Unfortunately, in some real-life circumstances, selling entities sometimes misrepresent, innocently or intentionally, the products or services that they offer, and the buying entity might not discover the misrepresentation until after a considerable amount of time has passed. Thus, buying entities would benefit from a means of making selling entities accountable, over the long term, to the buying entities to which the selling entities sell.

Thus, in one embodiment of the invention, while the ratings given in the phases preceding the "ongoing relationship" phase in the pipeline are one-time ratings that might be irreversible, the ratings given in the "ongoing relationship" phase are mutable. In one embodiment of the invention, the system described above provides a buying entity and/or a selling entity with the ability and opportunity to change the rating that one gave to the other in the "ongoing relationship" phase. The knowledge that a buying entity can change the "ongoing relationship" rating if some undesirable event occurs in the future motivates selling entities to be supportive of their products and services over the long term, and encourages selling entities to exercise care in how they represent their products and services.

In one embodiment of the invention, the "ongoing relationship" rating can be changed as often as the rating-giver desires. Thus, if a selling entity's product breaks, a buying entity may give the selling entity a low rating, but if the selling entity subsequently repairs or replaces the product, then the buying entity may change the rating to a high rating.

In one embodiment of the invention, the system described above tracks and maintains, for each selling entity, a number of "ongoing relationship" phases in which that selling entity is involved. In one embodiment of the invention, the system provides, to a buying entity, a page that indicates, for each of one or more selling entities, the number of "ongoing relationship" phases in which the selling entity is engaged with any buying entity. For example, the number of "ongoing relationships" in which a particular selling entity is involved may be represented next to each of the particular selling entity's solicitations in a page that displays a buying entity' list of selling entity solicitations, as discussed above.

For example, a page may display, in a list, a selling entity solicitation from selling entity "A" and a selling entity solicitation from selling entity "B." Next to the solicitation from selling entity "A," the page may display the number of "ongoing relationship" phases in which selling entity "A" is currently engaged, and next to the solicitation from selling entity "B," the page may display the number of "ongoing relationship" phases in which selling entity "B" is currently engaged.

A buying entity may use such numbers as a gauge to measure the reliability of each such selling entity. Buying entities may be naturally motivated to seek the services and products of selling entities that are engaged in larger quantities of "ongoing relationship" phases, if the ratings of those selling entities are also high. Buying entities may be naturally inclined to avoid the services and products of even highly rated selling entities if those selling entities appear to be reluctant to engage in many "ongoing relationship" phases with buying entities with which the selling entities have done business.

Thus, the "ongoing relationship" phase can be a valuable credential and advertising tool to selling entities. Selling entities that engage in many "ongoing relationship" phases and retain high ratings become distinguished, in buying entities' eyes, from other selling entities. Selling entities are motivated to enter the "ongoing relationship" phase with as many buying entities as possible. Thus, both buying entities and selling entities benefit from the "ongoing relationship" phase and the mutable rating that it offers.

In one embodiment of the invention, whenever a selling entity moves from one phase to another in the "pipeline" described above, the selling entity is charged a fee by the owner and/or operator of the automated system described above. In one embodiment of the invention, the fees charged for each successive phase are higher than the fees charged in the previous phases. In one embodiment of the invention, a selling entity that is engaged in an "ongoing relationship" phase with a buying entity is charged a periodic fee, similar to a subscription fee. Such fees motivate the owner and/or operator of the system described above to provide and operate the system.

In one embodiment of the invention, the system described above provides a selling entity with the option of withdrawing from an "ongoing relationship" phase. If a selling entity opts to withdraw from a particular "ongoing relationship" phase, then the selling entity is no longer charged the periodic fee, if any, that is associated with that phase, but the selling entity's associated rating and the number of "ongoing relationship" phases in which the selling entity is engaged may be modified to reflect the fact that the selling entity is no longer engaged in that particular "ongoing relationship" phase. A selling entity may optionally withdraw from some "ongoing relationship" phases with some buying entities while remaining in other "ongoing relationship" phases with other buying entities.

In one embodiment of the invention, when a selling entity withdraws from an "ongoing relationship" with a buying entity, the system described above provides the buying entity with a final opportunity to rate the selling entity. The final rating that the buying entity provides, if any, remains associated with the selling entity, on the selling entity's visible record, for a specified period of time (e.g., one year).

XI. Trusted Buyer Network

Although numerical ratings from anonymous or unknown entities may influence a particular entity's decision to do business with a rated entity, opinions of known, trusted friends and associates are often more influential in the particular entity's decision-making process.

Thus, in one embodiment of the invention, the system described above allows a particular buying entity to be associated with one or more other buying entities in the particular buying entity's "trusted buyer network." Additionally, the system described above allows one or more selling entities to be associated with a buying entity in a special "trusted buyer insight" relationship. The associations in a particular buying entity's "trusted buyer network" determine, at least partially, with which selling entities the particular buying entity is in "trusted buyer insight" relationships. The way in which a buying entity becomes involved in a "trusted buyer insight" with a selling entity is described below, and the effect of the "trusted buyer network" on the "trusted buyer insight" relationship is then described further below.

In one embodiment of the invention, the association of a selling entity with a particular buying entity in a "trusted buyer insight" relationship is indicative that (a) the particular buying entity has engaged in at least one of the "pipeline" phases with the selling entity, or that (b) a second buying entity, which is in the particular buying entity's "trusted buyer network," has engaged in at least one of the "pipeline" phases with the selling entity, even if the particular buying entity never has, or that (c) a third buying entity, which is in the "trusted buyer network" of a second buying entity that is in the particular buying entity's "trusted buyer network," has engaged in at least one of the "pipeline" phases with the selling entity, even if neither the particular buying entity nor the second buying entity ever has.

Thus, in one embodiment of the invention, whenever a buying entity enters a "pipeline" phase with a selling entity, the system described above automatically associates the buying entity with the selling entity in a "trusted buyer insight" relationship. Additionally, in one embodiment of the invention, whenever a particular buying entity enters a "pipeline" phase with a selling entity, the system described above automatically associates each buying entity in the particular buying entity's "trusted buyer network" with the particular selling entity in a separate "trusted buyer insight" relationship. Additionally, in one embodiment of the invention, whenever a particular buying entity enters a "pipeline" phase with a selling entity, the system described above automatically associates each buying entity in the "trusted buyer networks" of each buying entity in the particular buying entity's "trusted buyer network" with the particular selling entity in a separate "trusted buyer insight" relationship. The process by which one buying entity becomes part of another buying entity's "trusted buyer network" is described further below.

A process by which buying entities become part of other buying entities' "trusted buyer networks" is now described. In one embodiment of the invention, each buying entity's "trusted buyer network" is composed of two separate groups: the buying entity's "immediate" network, and the buying entity's "extended" network. In one embodiment of the invention, the system described above presents, to a particular buying entity, a page that allows the particular buying entity to invite another buying entity to join the particular buying entity's "trusted buyer network," and, more specifically, the particular buying entity's "immediate" network. In one embodiment of the invention, the page also contains two lists: (a) a list of other buying entities that have invited the particular buying entity to join their "trusted buyer networks," and (b) a list of other buying entities that the particular buying entity has previously invited to join the particular buying entity's "trusted buyer network." In one embodiment of the invention, an indication of whether the particular buying entity's invitation was accepted, declined, or pending (not yet accepted or declined) by an invited buying entity is displayed next to that invited buying entity in the latter list.

When a particular buying entity invites another buying entity to join the former's "trusted buyer network," the particular buying entity is added to the latter's list of buying entities that have extended invitations to join "trusted buyer networks," as described above. Next to each buying entity in the particular buying entity's list of other buying entities that have invited the particular buying entity to join their "trusted buyer networks," the system described above may display an "accept" control and a "decline" control. If a user controlling the particular buying entity activates the "accept" control, then the particular buying entity is added to the inviting buying entity's "trusted buyer network," and, more specifically, to the inviting buying entity's "immediate" network. In one embodiment of the invention, this acceptance also causes the system described above to add the inviting buying entity to the particular buying entity's "immediate" network. Conversely, if a user controlling the particular buying entity activates the "decline" control, then the inviting buying entity's list of invited buying entities is updated to indicate that the particular buying entity has declined the inviting buying entity's invitation. Thus, buying entities may join the "trusted buyer networks" of others and invite others to join their own "trusted buyer networks."

The size of a buying entity's "trusted buyer network" may beneficially influence selling entities' behavior relative to that buying entity. In one embodiment of the invention, whenever the system described above provides, to a selling entity, a list of buying entities and/or buying entity's Needcasts™, the system displays, next to each of one or more entries in that list, a number that indicates how many other buying entities are in the "trusted buyer network" of that entry's corresponding buying entity. For example, if buying entity "A" has 15 other buying entities in its "trusted buyer network," then, in a list of Needcasts™ displayed to a selling entity, each Needcast™ originating from buying entity "A" may have the number "15" displayed next to it.

A large number of entities in a buying entity's "trusted buyer network" signals, to a selling entity, that the corresponding buying entity wields significant influence among buying entities in the system, and, as such, should be handled with due respect and care. If an influential buying entity gives a selling entity a high rating, then the selling entity's status in the system may be elevated significantly in the eyes of other buying entities. Conversely, if an influential buying entity gives a selling entity a low rating, then the selling entity's status in the system may be tarnished significantly in the eyes of other buying entities. Buying entities are naturally motivated to join as many "trusted buyer networks" as possible in order to increase their actual and selling entity-perceived influence in the system.

In one embodiment of the invention, in lists of selling entities and/or selling entity solicitations that are displayed to a buying entity, those of the selling entities that are associated with the buying entity in a "trusted buyer insight" relationship, and/or the solicitations of those selling entities, are visibly distinguished from other selling entities and/or solicitations. For example, in a list of solicitations presented to a buying entity, a special "circle-T" logo may be displayed next to each solicitation of a selling entity that is in the "trusted buyer insight" relationship with the buying entity.

A buying entity may find such a special designation useful when investigating solicitations or seeking for a product or service provider to fill the buying entity's need. The designation helps distinguish the designated selling entities from other selling entities that are not so designated. A selling entity may find such a special designation useful as a credential that distinguishes that selling entity from others in the eyes of a buying entity.

In one embodiment of the invention, in response to a particular buying entity's inquiry relative to a selected selling entity, the system described above displays a page that shows how the particular buying entity has become involved in "trusted buyer insight" relationship with a selected selling entity. The page may contain a separate icon for each participant in the relationship. Because the relationship may occur through one or more degrees of separation between the particular buying entity and the selling entity, the page may display multiple icons and their connections to each other.

In one embodiment of the invention, the page indicates an icon for the particular buying entity and an icon for the selling entity. If the particular buying entity has never entered a "pipeline" phase with the selling entity, then the page also indicates another icon that represents a second buying entity that has entered a "pipeline" phase with the selling entity. If the second buying entity is not in the particular buying entity's "immediate" network (but is in the particular buying entity's "extended" network), then the page also indicates yet another icon that represents a third buying entity, where (a) the third buying entity is in the particular buying entity's "immediate" network and (b) the second buying entity is in the third buying entity's "immediate" network. Thus, in one embodiment of the invention, the page displays the particular buying entity's icon, which is connected by a line to the third buying entity's icon, which is connected by a line to the second buying entity's icon, which is connected by a line to the selling entity's icon.

In one embodiment of the invention, buying entities that are not in the particular buying entity's own "immediate" network are not identified by name to the particular buying entity. Thus, while the page described above may display an icon for the second buying entity, the page may omit the identity of the second buying entity because the second buying entity is not in the particular buying entity's "immediate" network.

In one embodiment of the invention, the page described above indicates one or more ratings (e.g., per "pipeline" phase and/or an overall rating) given to the selling entity by the buying entity that entered into a "pipeline" phase with the selling entity. Thus, the particular buying entity may see the opinions of those that he trusts, and/or the opinions of those that trust those that he trusts, relative to the selling entity.

In one embodiment of the invention, the page also displays control that, when activated, allows the particular buying entity to ask a question of the buying entity that rated the selling entity (the "rating" entity hereafter). If the rating entity is in the particular buying entity's "immediate" network, then the system described above forwards the question to the rating entity. The rating entity may respond to the question, in which case the system described above forwards the response to the particular buying entity.

However, if the rating entity is not in the particular buying entity's "immediate" network, then the system described above forwards the question to the third buying entity, in whose "immediate" network the rating entity is, without revealing the rating entity's identity to the particular buying entity. The third buying entity receives the question, and, through the system, either agrees to allow the question to be forwarded to the rating entity, or declines to allow the question to be forwarded to the rating entity.

If the third buying entity agrees to allow the question to be forwarded to the rating entity, then the system forwards the question to the rating entity. In one embodiment of the invention, the message forwarded to the rating entity identifies the third buying entity as well as the particular buying entity. Upon receiving the message, the rating entity then may respond to the question, in which case the system forwards the response to the particular buying entity. In one embodiment of the invention, the rating entity's identity is revealed in the rating entity's response to the particular buying entity.

Alternatively, if the third buying entity does not agree to allow the question to be forwarded to the rating entity, then the system may notify the particular buying entity that the third buying entity has declined to allow the question to be forwarded to the rating entity, and the system does not forward the question. The rating entity remains anonymous to the particular buying entity.

In one embodiment of the invention, the page that the system displays to the particular buying entity (or, alternatively, another page) also indicates questions that other buying entities want to ask rating entities that are in the particular buying entity's "immediate" network (but not in the other buying entities' "immediate" network). Via controls displayed next to each such question, the particular buying entity may allow or prevent the system from forwarding the questions to the indicated rating entities.

In one embodiment of the invention, the page that the system displays to the particular buying entity (or, alternatively, another page) also indicates questions that other buying entities are asking the particular buying entity about one or more selling entities that the particular buying entity has rated. Next to each such question, the page may display the rating(s) that the particular buying entity gave to the selling entity to which the question pertains. Via controls displayed next to each such question, the particular buying entity may respond to the questions.

According to one embodiment of the invention, the system described above provides each particular buying entity with a mechanism for displaying all or a subset of all of the selling entities with which other buying entities in the particular buying entity's "trusted buyer network" have previously transacted business. For example, in response to a particular buying entity's request for a list, the system described above may generate and display a list of all selling entities that have previously been or are currently associated (through a "pipeline phase") with another buying entity from the particular buying entity's "trusted buyer network." For another example, in response to a particular buying entity's request for a list, the system described above may generate and display a list of all selling entities that have received at least one rating from another buying entity from the particular buying entity's "trusted buyer network."

The list may be sorted by various criteria, or by combinations of criteria, which may be selectable by the particular buying entity who has requested the list. For example, the list may be sorted based on ratings associated with the selling entities, based on customized filter scores (that are based on the particular buying entity's specified criteria) for the selling entities, and/or based on ratings which one or more other specified buying entities in the particular buying entity's "trusted buyer network" have given to the selling entities.

XII. Referral Incentives

Company websites often post executive or manager biographies on Internet-accessible pages (i.e., "web" pages) in order to instill confidence in the eyes of inventors or prospective customers. Usually, a person about whom such a biography has been posted does not want this biographical information to be used by solicitors in any attempt by the solicitors to gain an audience with the person, either personally or via phone or e-mail.

In order to deter solicitors from engaging in this undesirable behavior, and to encourage solicitors to use the system described above instead, in one embodiment of the invention, a graphical image such as a GIF or a JPEG is displayed on the page that contains the biography. The image contains instructions that tell the solicitors to use the system described above to send solicitations to the person. For example, the instructions may read, "NO SOLICITING. Please do not make sales calls to individuals on this page. They are registered at MyHandshake and are prepared to receive your contact there."

The code (e.g., HTML code) for the page contains a hyperlink that is associated with the image (e.g., in the HTML image tag for the image), such that when a solicitor clicks on the image using his browser, the solicitor's browser is automatically directed to a website that implements the system described above with reference to the figures of the present application.

A unique identity of a user that placed the image on the page is embedded in the hyperlink. As a result, when the solicitor's browser is directed to the website that implements the system, the identity of the user that placed the image is passed to the website and recognized by the system. The system may reward the user in response to receiving a "hit" from the solicitor's browser due to the browser being directed to the system by the image. Additionally or alternatively, the system may reward the user in response to a solicitor creating a seller account with the system during the same HTTP session in which the solicitor's browser was directed to the system by the image. For example, as a reward, a credit may be added to the user's account, or the user may be entered into a publicized drawing for a prize.

In one embodiment of the invention, the user that places the image on the company's page does not need to create either the image or the associated code that contains the hyperlink that directs browsers to the system. Instead, in one embodiment of the invention, such an image and the associated code (or the associated code alone) is generated automatically by the system described above with reference to the figures of the present application. When a buying entity accesses a particular URL of the system, the system executes a script or program that automatically generates a page that contains the image with the associated code, which indicates the buying entity's identity—the user's identity. The script or program is aware of the user's identity because the user has to provide his identity when he logs in to the system, and the user has to log into the system in order to access the particular URL that generates the image and associated code. The user may copy and paste the image and code from the automatically generated page into a page of a company's website, so that the image and accompanying code will be sent thereafter to the browser of everyone who visits that page of the company's website.

In one embodiment of the invention, the system presents the user/buying entity with a plurality of different images prior to the automatic generation of the code that contains the user-identifying hyperlink. When the user/buying entity selects an image, then the system executes the script or program that automatically generates a page that contains the selected image and the automatically generated code. Thus, in one embodiment of the invention, a user can "customize" the image that he would like to place on the company website's page.

XIII. Obtaining Reliable Information about a Seller's Practices

As is discussed above, a person seeing or hearing an advertisement for a selling entity's products or services often cannot discern from that advertisement whether or not the selling entity is trustworthy, or whether the information presented in the advertisement is reliable. Certain embodiments of the invention described herein assist a person—a prospective buying entity—in determining whether a selling entity is trustworthy and whether it would be advisable for the person to do business with that selling entity. Instead of relying blindly on information presented in a selling entity's advertisement, a person can obtain information gathered within the system described above in order to judge the reliability of the information presented in the advertisement. Because the information gathered within the system described above is based on the past experiences of buying entities that have previously done business with the selling entity, the information presented within the system is a more reliable indicator of the selling entity's trustworthiness.

Indeed, in certain embodiments of the invention, if the person seeking reliable information about a selling entity is already (or chooses to become) a registered buying entity recognized by the system described above, the system can provide, to the buying entity, customized information that is specifically tailored to the buying entity based on the buying entity's specified selling entity filter criteria (simply referred to as "filter criteria" below).

FIGS. 10A-F show a flow diagram that depicts a technique for allowing buying entities (prospective or registered) to obtain reliable and trustworthy information about selling entities' business practices and reputations, in accordance with an embodiment of the invention. Certain steps of the technique illustrated in FIGS. 10A-F may be performed by server device 110 shown in FIG. 1, for example.

Figure 10A:
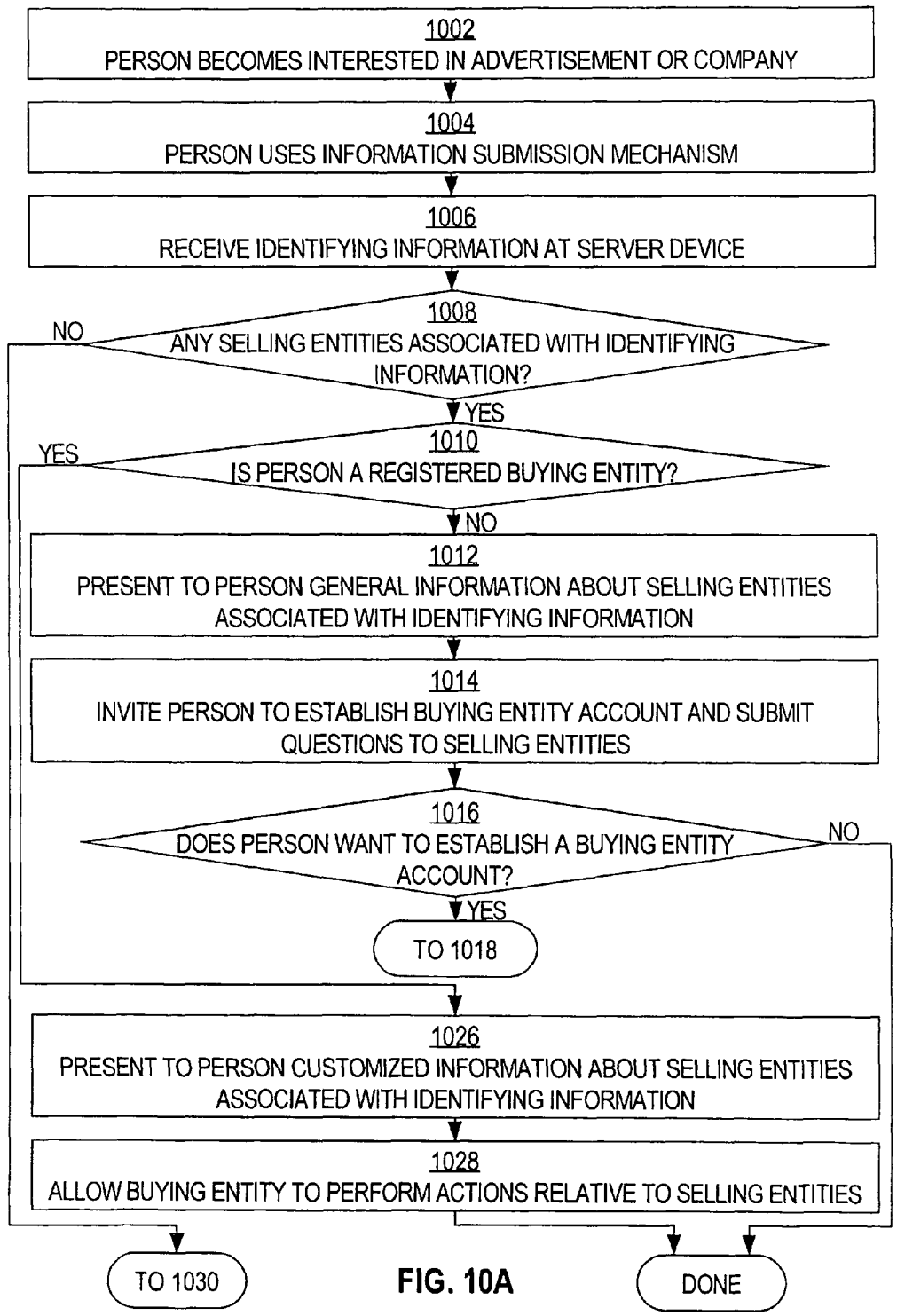

Referring first to FIG. 10A, in block 1002, a person (a prospective or registered buying entity) sees or hears an advertisement or a reference to a company and becomes interested in the company or in information presented in the advertisement. The person might be user 120A, shown in FIG. 1, for example.

In block 1004, the person uses an information submission mechanism through which the person can submit identifying information to a server device, such as server device 110, for example. The information submission mechanism may take several forms. For example, the information submission mechanism may take the form of a text entry field within a form on a web page that HTTP client 106A (in FIG. 1) requests and receives from HTTP server 112 (also in FIG. 1). The web page might be provided by a business-to-business connectivity service such as the service described above, for example. For another example, the information submission mechanism may take the form of a "widget" that resides on client device 104A (in FIG. 1). As used herein, a "widget" is a program that executes on a computer and manifests a graphical user interface on the "desktop" of the operating system executing on the computer. The widget's graphical user interface may include a text entry field into which a user can submit the identifying information. The widget may be provided by a business-to-business connectivity service as a freely downloadable program, for example.

In block 1006, identifying information, submitted by the person through the information submission mechanism, is received at the server device. The identifying information may take several forms. For example, the identifying information might take the form of a company's name. For another example, the identifying information might take the form of a company's telephone number, or the telephone number of an employee of a company. For yet another example, the identifying information might take the form of a URL of a company's website. For yet another example, the identifying information might take the form of the name of product or service sold by a company. The person might obtain the identifying information from the advertisement that he saw or heard as described with reference to block 1002, for example. Alternatively, the person might learn or obtain the identifying information through other means or channels.

According to one embodiment of the invention, regardless of the form of the information submission mechanism and the form of the identifying information, in response to the person's submission of the identifying information through the identifying mechanism, a client device on which the information submission mechanism was presented (e.g., client device 104A) sends the identifying information over a network (e.g., Internet 102) to the server device (e.g., server device 110). Consequently, the server device receives the identifying information. According to one embodiment of the invention, the server device is owned and/or operated by a business-to-business connectivity service of the kind described above.

In one embodiment of the invention, further communications between the person and the server device, such as the communications described below, are transmitted via HTTP between an HTTP server (e.g., HTTP server 112) accessible by the server device and an HTTP client (e.g., HTTP client 106A) accessible by the person.

In block 1008, a determination is made as to whether there are any registered selling entities associated with the identifying information submitted in block 1006. As is discussed above, when a selling entity establishes a selling entity account, that selling entity may specify seller attributes that are then stored (e.g., in database 116 of FIG. 1) in association with that selling entity account. Among other information items, the seller attributes may include a company name, a telephone number, a URL, and/or name(s) of product(s) and/or service(s) that the selling entity sells, for example. Thus, by searching seller attributes that are associated with registered selling entities, the server device may identify one or more selling entities that are associated with the identifying information (more than one selling entity might be associated with the same company, phone number, URL, product, or service, for example). If the server device identifies one or more registered selling entities that are associated with the identifying information, then control passes to block 1010. Otherwise, control passes to block 1030 (in FIG. 10C).

In block 1010, a determination is made as to whether the person is a registered buying entity. For example, server device 110 may make this determination. This determination may be made in any of several ways. For example, in one embodiment of the invention, when a buying entity establishes a buying entity account as described above, a "cookie" that identifies the buying entity is automatically stored on the buying entity's computer (e.g., client device 104A). The server device may request this "cookie" from the buying entity's computer and use the information contained therein to identify the buying entity. The absence of the "cookie" on the person's computer may indicate that the person is not yet a registered buying entity. For another example, in one embodiment of the invention, when a buying entity directs his HTTP client to an initial web page provided by HTTP server 112, or when the "widget" on the buying entity's computer starts, the buying entity is asked to supply a username and password associated with the buying entity's account. The username and password may be submitted to the server device, which may use the username to identify the buying entity. If the server device determines that the person is a registered buying entity, then control passes to block 1026. Otherwise, control passes to block 1012.

In block 1012, general information (not customized based on criteria associated with a buying entity account) about one or more selling entities associated with the identifying information is presented to the person. Server device 110 may assemble and present this general information to the person, for example. This general information may include, for example, identities of the selling entities and rating information that was previously supplied by registered buying entities that previously did business with the selling entities, as described above in Section IX, "PIPELINE PHASES AND RATINGS." Because the rating information comes from those who actually did business with the selling entities in the past, the rating information may be considered to be less biased, more reliable, and more trustworthy than information that is presented in the selling entities' own advertisements. Control passes to block 1014.

In block 1014, the person is asked whether he would like to establish a buying entity account, thereby becoming a registered buying entity and gaining access to enhanced and customized information about selling entities—customized information that is not available to the person unless he establishes a buying entity account. Additionally, in block 1014, the person may be invited to submit one or more questions to one or more selling entities that were listed within the general information presented in block 1012. For example, server device 110 may ask the person, via a web page, whether the person would like to join the business-to-business connectivity service by establishing a buying entity account, and additionally present one or more text entry fields into which the person may enter one or more questions to be sent to one or more of the selling entities listed. Control passes to block 1016.

In block 1016, a determination is made, based on the person's response to the invitation presented in block 1014, as to whether the person wants to establish a buying entity account, thereby becoming a registered buying entity. Server device 110 may make this determination, for example. If the person wants to establish a buying entity account, then control passes to block 1018 (in FIG. 10B). Otherwise, the technique illustrated in FIGS. 10A-F is finished.

Figure 10B:
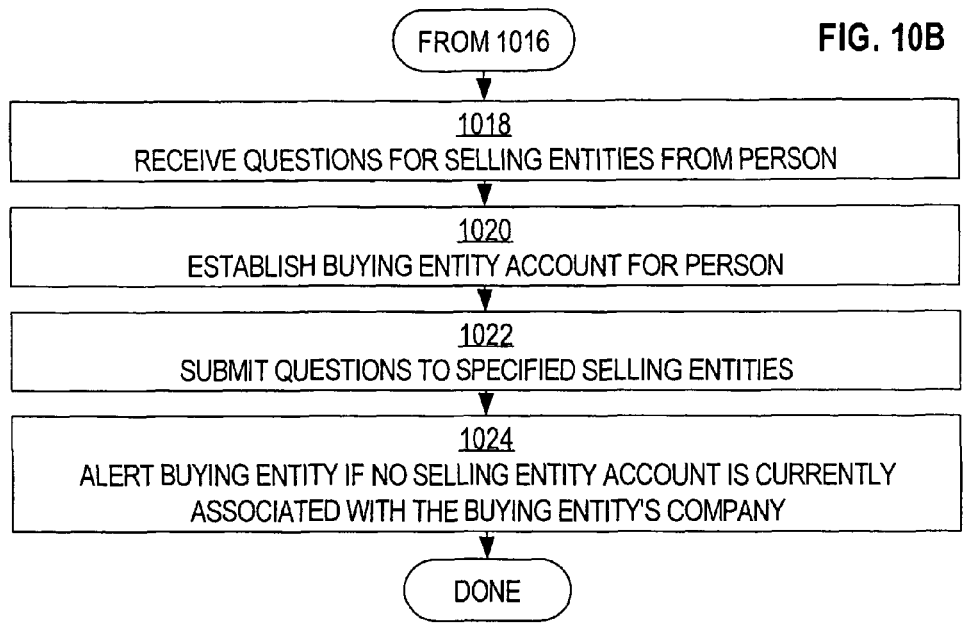

Referring now to FIG. 10B, in block 1018, one or more questions for one or more selling entities are received from the person. For example, server device 110 may receive such questions as a result of the person causing HTTP client 104A to submit a completed HTML form to HTTP server 112. Control passes to block 1020.

In block 1020, the person establishes a buying entity account on the server, thereby becoming a registered buying entity. Example processes for establishing buying entity accounts are described above in previous sections. Among the information that may be associated with a buying entity account (e.g., buyer account 202 in FIG. 2) when the account is initially established is a set of filter criteria (e.g., selling entity filter criteria 204 in FIG. 2) specified by the buying entity. As will be seen below, such filter criteria can be used to generate and present, to the buying entity, enhanced and customized information related to selling entities' reputations and transactional histories. Control passes to block 1022.

In block 1022, one or more questions that the now-registered buying entity submitted in response to the invitation presented in block 1014 are submitted to the selling entities for which they are intended (as specified by the person). For example, in response to the buying entity's submission of one or more questions via text entry fields in a form on a web page, server device 110 may cause the questions to be e-mailed to the appropriate selling entities and/or placed in server device-maintained "in boxes" associated with the selling entities.

In one embodiment of the invention, the questions are sent to the appropriate selling entities in a manner similar to the manner in which questions are sent in response to a buying entity's activation of a "question seller" control, as is described above in Section VII, "ACTING ON SOLICITATIONS." In one embodiment of the invention, the buying entity's "real life" identity and contact information are obscured from the question recipients, so that the question recipients are deterred from responding to the buying entity outside of channels provided by server device 110. In one embodiment of the invention, the sending of the questions to the one or more selling entities causes the buying entity to enter an initial pipeline phase (e.g., an "invitation" phase) with each of those selling entities, as is described above in Section IX, "PIPELINE PHASES AND RATINGS." Control passes to block 1024.

In block 1024, if the buying entity's company (which the buying entity indicates upon establishing a buying entity account) is not currently associated with any selling entity account, then the buying entity is alerted that the buying entity's company is not currently associated with any selling entity account. For example, server device 110 may alert the buying entity in this manner. Because the buying entity's company is not currently associated with any selling entity account, other people using the foregoing process to seek reliable information about the buying entity's company would not be able to obtain much useful information about the buying entity's company. Thus, at this time, an invitation may be extended to the buying entity to establish a selling entity account with which the buying entity's company name will be associated. The technique illustrated in FIGS. 10A-F is then finished.

Alternatively, referring again to FIG. 10A, in block 1026, specific, customized (based on criteria associated with the buying entity's account) information about one or more selling entities associated with the identifying information is presented to the buying entity. Server device 110 may assemble and present this specific information to the buying entity, for example.

Because the buying entity's filter criteria are known, the one or more selling entities may be filtered and/or ranked and sorted based on the extent to which the seller attributes associated with those selling entities satisfy the filter criteria associated with the buying entity account. For each selling entity associated with the identifying information, a score may be determined based on the extent to which that selling entity's associated attributes satisfy the buying entity's filter criteria. For each such selling entity, that selling entity's associated score may be displayed in conjunction with other information associated with that selling entity. The relevant selling entities may be scored, filtered, ranked, and sorted in a manner similar to the manner by which solicitations are scored, filtered, ranked, and sorted as described above in Section V, "RANKING SOLICITATIONS" (a difference being that, in this case, the selling entities themselves, rather than the selling entities' solicitations, are being scored, filtered, ranked, and sorted).

FIG. 11 shows an example of what the specific information about the selling entities associated with the identifying information might look like, according to an embodiment of the invention. The specific information may include, for example, identities of the selling entities and, for each selling entity, rating information that was previously supplied by registered buying entities that previously did business with that selling entity, as described above in Section IX, "PIPELINE PHASES AND RATINGS." Because the rating information comes from those who actually did business with the selling entities in the past, the rating information may be considered to be less biased, more reliable, and more trustworthy than information that is presented in the selling entities' own advertisements. The specific information also might indicate, for each selling entity, a number of ongoing relationships in which that selling entity is currently engaged (as described above in Section X, "ONGOING RELATIONSHIP PHASE"), and/or whether that selling entity is in a "trusted buyer insight" relationship with the buying entity (as described above in Section XI, "TRUSTED BUYER NETWORK"). Control passes to block 1028.

Referring again to FIG. 10A, in block 1028, the buying entity is allowed to perform, relative to any of the one or more selling entities, any of the actions usually available to buying entities, as described above in foregoing sections. For example, the buying entity may submit a question to a selling entity using techniques described above. Actions that the buying entity performs relative to a selling entity may cause the buying entity and the selling entity to enter a pipeline phase together, as described above. The technique illustrated in FIGS. 10A-F is then finished.

Under some circumstances, the determination made in block 1008 might produce a conclusion that the identifying information submitted in block 1006 is not currently associated with any registered selling entity—this might be the case, for example, when the identifying information is a company name, but no selling entity from the company having that name has yet established a selling entity account. Referring now to FIG. 10C, under such circumstances, in block 1030, information about one or more other companies and/or selling entities merely related in some way to the identifying information (however loosely) is presented to the person, if possible. For example, assuming that the identifying information submitted in block 1006 is a company name, server device 110 might determine an industry category to which the company having that name belongs, and then display information about one or more other companies in the same industry category, and/or information about one or more registered selling entities that are associated with those other companies. The information presented to the person may include rating information associated with the presented companies and/or selling entities, in a manner similar to that described above with reference to block 1026. If the person to whom the information is to be presented is a registered buying entity, then the information presented to the person may be customized based on filter criteria associated with the person's buying entity account. Under such circumstances, for example, selling entities may be scored, filtered, ranked, and sorted based on the filter criteria. After the operations of block 1030 have been completed, control passes to block 1032.

The server device might or might not have any information pertaining to the identifying information submitted in block 1006. For example, if the identifying information is a company name of a relatively new company, database 116 might not yet contain even the company name or the industry category to which the company having that name belongs. In block 1032, a determination is made as to whether the identifying information is known or recognized. For example, if the identifying information is a company name, then server device 110 may search database 116 for that company name. If the company name is not contained in database 116, then server device 110 may conclude that the identifying information is not known or recognized. In one embodiment of the invention, server device 110 constructs a list of company names that are similar to, but not exactly the same as, a company name that the person submitted in block 1006, and asks the person if any company named in the list is the same as the company that the person named in block 1006. If the identifying information is known and recognized, then control passes to block 1034. Otherwise, control passes to block 1050 (in FIG. 10D).

In block 1034, the person is informed that although the identifying information is known and recognized, there is no registered selling entity account currently associated with that identifying information. Additionally, the person is offered the opportunity to ask a prospective selling entity a question. Additionally, the person is offered the opportunity to invite a prospective selling entity (who would be associated with the identifying information if registered) to establish a selling entity account via the server device. For example, server device 110 can provide this information and these offers to the person within a web page. The web page may contain controls (e.g., buttons) that the person can activate to signify either that the person does want to invite a prospective selling entity to establish a selling entity account, or that the person does not want to do so. Control passes to block 1036.

In block 1036, a determination is made as to whether the person wants to ask a prospective selling entity a question and invite that prospective selling entity to establish a selling entity account. For example, server device 110 may make such a determination based on the person's selection of a particular control in a web page. If the person wants to ask a prospective selling entity a question and invite that prospective selling entity to establish a selling entity account, then control passes to block 1038. Otherwise, the technique illustrated in FIGS. 10A-F is finished.

In block 1038, a determination is made as to whether the person is a registered buying entity. Some techniques by which this determination can be made are discussed above with reference to block 1010. If the server device determines that the person is a registered buying entity, then control passes to block 1048. Otherwise, control passes to block 1040.

In block 1040, a determination is made as to whether the person wants to establish a buying entity account, thereby becoming a registered buying entity. Server device 110 may make this determination, for example. If the person wants to establish a buying entity account, then control passes to block 1042. Otherwise, the technique illustrated in FIGS. 10A-F is finished.

In block 1042, one or more questions for one or more selling entities are received from the person. A technique for receiving such questions is described above with reference to block 1018, for example. Control passes to block 1044.

In block 1044, the person establishes a buying entity account on the server, thereby becoming a registered buying entity. A technique by which a person can establish such an account is described above with reference to block 1020, for example. Control passes to block 1046.

In block 1046, if the buying entity's company (which the buying entity indicates upon establishing a buying entity account) is not currently associated with any selling entity account, then the buying entity is alerted that the buying entity's company is not currently associated with any selling entity account. Similar operations are described above with reference to block 1024, for example. Control passes to block 1066 (in FIG. 10E).

Alternatively, in block 1048, one or more questions for one or more selling entities are received from the buying entity. A technique for receiving such questions is described above with reference to block 1018, for example. Control passes to block 1066 (in FIG. 10E).

Alternatively, referring now to FIG. 10D, in block 1050, the person is informed that the identifying information is not known or recognized, and there is no registered selling entity account currently associated with that identifying information. Additionally, the person is offered the opportunity to ask a prospective selling entity a question. Additionally, the person is offered the opportunity to invite a prospective selling entity (who would be associated with the identifying information if registered) to establish a selling entity account via the server device. Examples of similar operations are described above with reference to block 1034. Control passes to block 1052.

In block 1052, a determination is made as to whether the person wants to ask a prospective selling entity a question and invite that prospective selling entity to establish a selling entity account. This determination is similar to the determination described above with reference to block 1036, for example. If the person wants to ask a prospective selling entity a question and invite that prospective selling entity to establish a selling entity account, then control passes to block 1054. Otherwise, the technique illustrated in FIGS. 10A-F is finished.

In block 1054, a determination is made as to whether the person is a registered buying entity. Some techniques by which this determination can be made are discussed above with reference to block 1010. If the server device determines that the person is a registered buying entity, then control passes to block 1064. Otherwise, control passes to block 1056.

In block 1056, a determination is made as to whether the person wants to establish a buying entity account, thereby becoming a registered buying entity. Server device 110 may make this determination, for example. If the person wants to establish a buying entity account, then control passes to block 1058. Otherwise, the technique illustrated in FIGS. 10A-F is finished.

In block 1058, the person is invited to submit one or more questions for a prospective selling entity, and one or more questions for the prospective selling entity are received from the person. Additionally, the person is invited to submit contact data that can be used to contact and/or identify a prospective selling entity (since there are currently no registered selling entities associated with the identifying information submitted in block 1006), and such contact data is received from the person. Such contact data may include, for example, a company name, a phone number, an e-mail address, and/or a URL. For example, server device 110 may receive such questions and contact data as a result of the person causing HTTP client 104A to submit a completed HTML form to HTTP server 112. Control passes to block 1060.

In block 1060, the person establishes a buying entity account on the server, thereby becoming a registered buying entity. A technique by which a person can establish such an account is described above with reference to block 1020, for example. Control passes to block 1062.

In block 1062, if the buying entity's company (which the buying entity indicates upon establishing a buying entity account) is not currently associated with any selling entity account, then the buying entity is alerted that the buying entity's company is not currently associated with any selling entity account. Similar operations are described above with reference to block 1024, for example. Control passes to block 1066.

Alternatively, in block 1064, the buying entity is invited to submit one or more questions for a prospective selling entity, and one or more questions for the prospective selling entity are received from the buying entity. Additionally, the buying entity is invited to submit contact data that can be used to contact and/or identify a prospective selling entity (since there are currently no registered selling entities associated with the identifying information submitted in block 1006), and such contact data is received from the buying entity. Such contact data may include, for example, a company name, a phone number, an e-mail address, and/or a URL. For example, server device 110 may receive such questions and contact data as a result of the buying entity causing HTTP client 104A to submit a completed HTML form to HTTP server 112. Control passes back to block 1066.

Figure 10F:
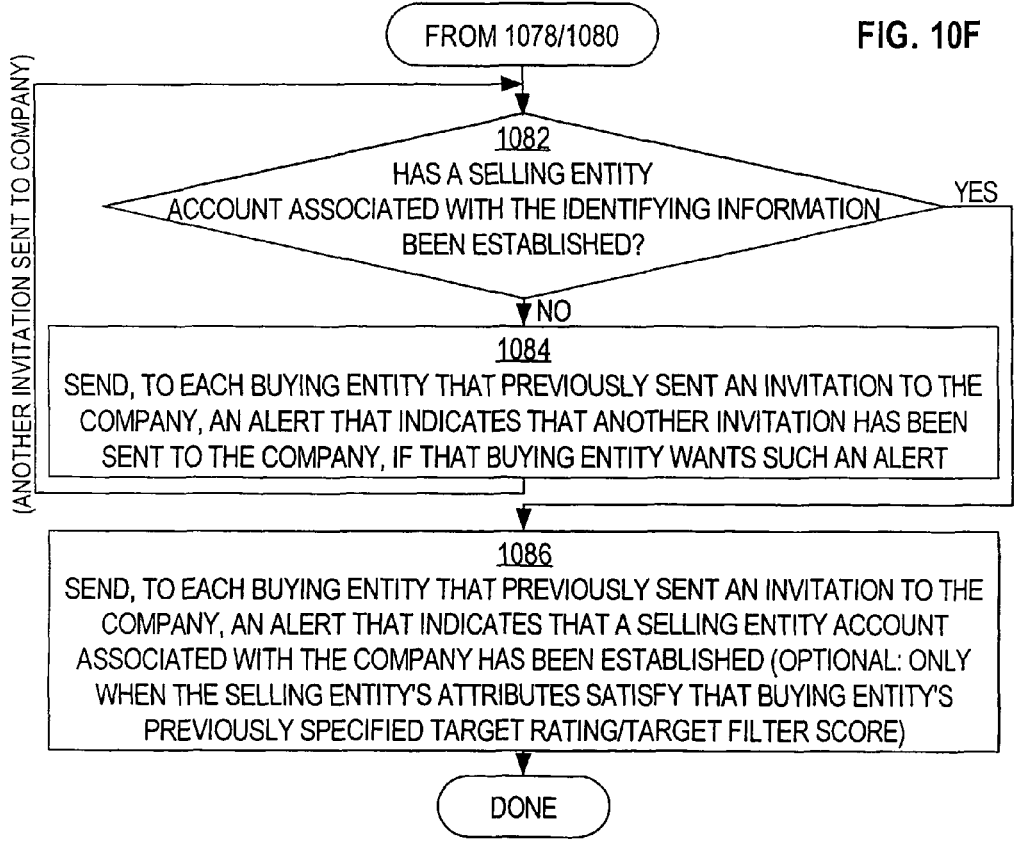
Figure 10C:
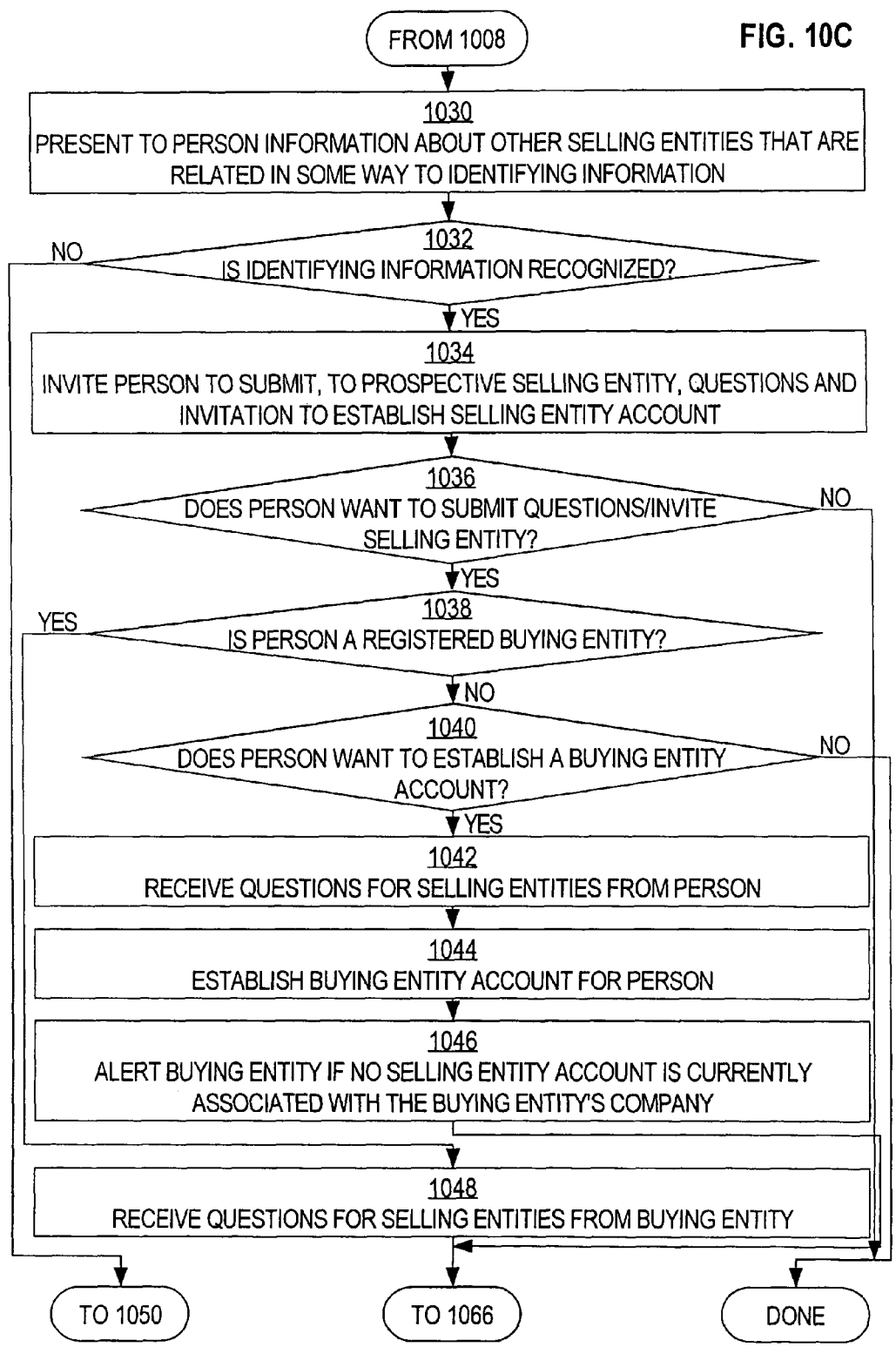
Figure 10E:
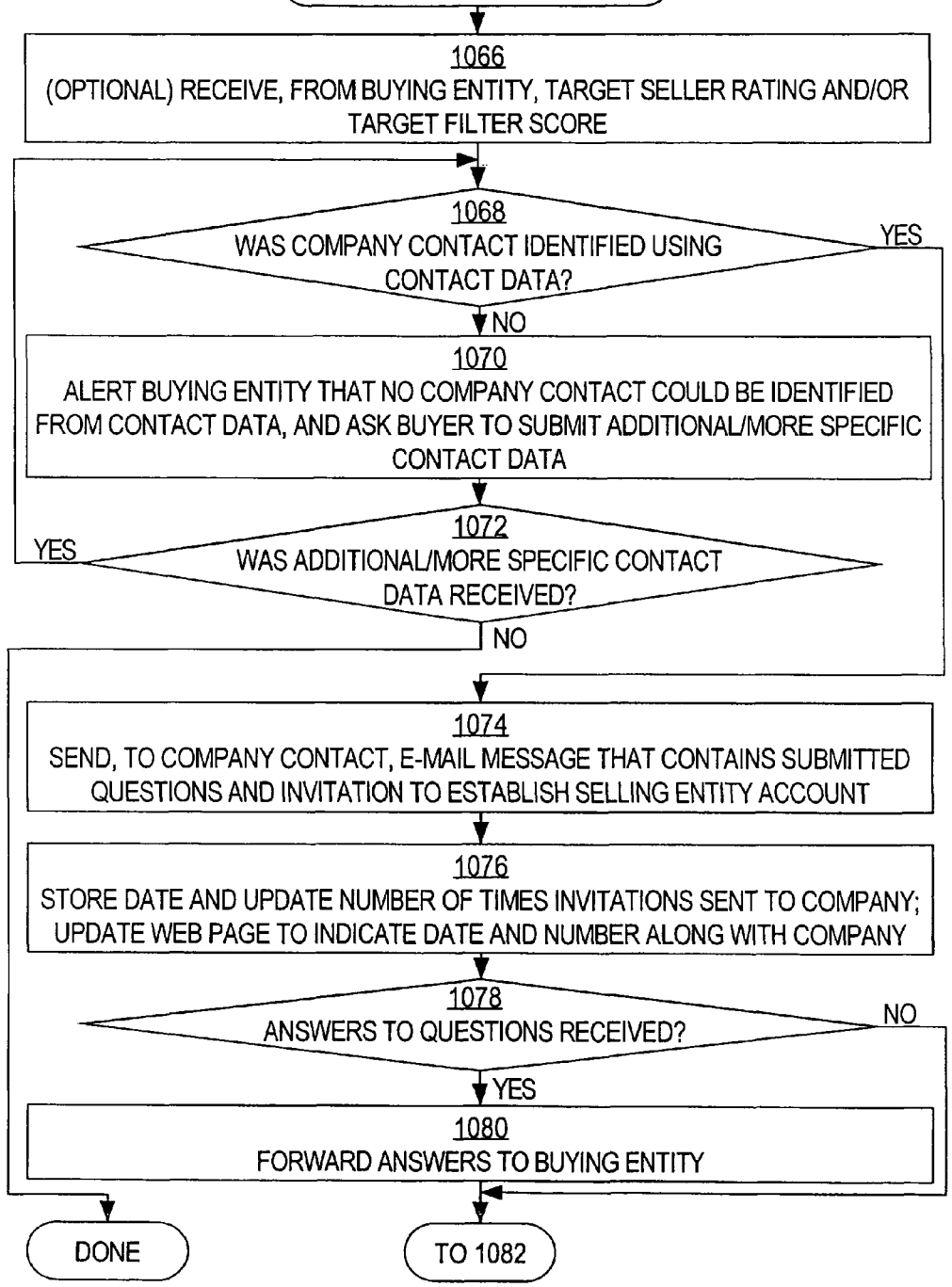

Referring now to FIG. 10E, in block 1066, optionally, the buying entity is asked to specify a target seller rating and/or a target filter score, the achievement of either of which by the prospective selling entity will cause an alert to be sent automatically to the buying entity, notifying the buying entity that the (currently prospective) selling entity's seller rating has reached the specified target seller rating and/or that the (currently prospective) selling entity's filter score, as computed based on the buying entity's filter criteria, has reached the specified target filter score. After the buying entity has been asked to specify such a target seller rating and/or such a target filter score, then server device 110 may receive the target seller rating and/or target filter score from the buying entity and then store the target seller rating and/or target filter score in association with the buying entity's account for later use. Control passes to block 1068.

After the contact data has been received in either block 1058 or block 1064, attempts are made to identify a company contact using the contact data. For example, an employee of a business-to-business connectivity service may search a telephone book or yellow pages for a company contact associated with a company name or telephone number specified in the contact data. For another example, such an employee may try to identify a company contact by (a) directing a web browser to a URL specified in the contact data and (b) determining whether web pages accessible from that URL identify a company contact. For yet another example, server device 110 might automatically send, to an e-mail address either specified in the contact data or approximated from a URL specified in the contact data, an e-mail that asks someone to identify (e.g., by return e-mail) a company contact for a company for which he or she works.

In block 1068, a determination is made as to whether attempts to identify a company contact using the contact data have been successful. In other words, a determination is made as to whether a company contact actually has been identified. If a company contact has been identified, then control passes to block 1074. Otherwise, control passes to block 1070.

In block 1070, an alert is sent to the buying entity. The alert informs the buying entity that no company contact (i.e., a point of contact at the company) could be identified based on the contact data that the buying entity provided. The alert also asks the buying entity to submit, to the server device, additional or more specific contact data. For example, server device 110 may send such an alert to the buying entity by sending an e-mail to an e-mail address associated with the buying entity's account. Control passes to block 1072.

In response to the buying entity's receipt of such an alert, server device 110 may receive additional or more specific contact data from the buying entity. In block 1072, a determination is made as to whether additional or more specific contact data ("revised contact data") has been received from the buying entity (or, alternatively, from another source). If revised contact data has been received, then additional attempts to identify a company contact are made based on the revised contact data, and control passes back to block 1068. Otherwise, in one embodiment of the invention, the technique illustrated in FIGS. 10A-F is finished.

Alternatively, in block 1074, an e-mail message is automatically sent to an identified company contact. For example, server device 110 may automatically send such an e-mail message. The e-mail message may explain, to the message recipient, the existence, nature, and purpose of an on-line business-to-business connectivity service from whence the e-mail message originated. In one embodiment of the invention, the e-mail message contains one or more questions that were submitted by a buying entity as described above with reference to blocks 1048, 1058, and 1064. In one embodiment of the invention, the e-mail message obscures the "real life" identity and contact information of the buying entity who submitted the question(s), so that the message recipient is deterred from attempting to contact the buying entity outside of communication channels provided by the on-line business-to-business connectivity service described above. The e-mail message additionally invites the message recipient and others at the message recipient's company to establish selling entity accounts so that they can interact with the buying entity (not expressly identified) who authored the question(s). Control passes to block 1076.

In block 1076, data indicating a date on which the e-mail message was sent is stored. For example, server device 110 may store such a date in database 116. Server device 110 may associate the date with the identifying information received block 1006. In one embodiment of the invention, each time that an e-mail message is sent to a contact associated with the same identifying information (e.g., the same company name), server device 110 increments a counter that is associated with that identifying information in database 116.

In one embodiment of the invention, for each company to which such an e-mail message has been sent, but from which there are still no associated registered selling entities (i.e., registered selling entities whose associated seller attributes identify the company), server device 110 makes publicly available (e.g., by posting on a web page) both (a) the earliest date on which an e-mail message was sent to a company contact associated with the company, and (b) the number of times that e-mail messages have been sent to company contacts associated with the company.

The public availability of this date and number may encourage prospective selling entities to establish selling entity accounts so that they do not appear to be avoiding the generation of a reputation through the techniques and mechanisms described herein. Furthermore, the date and number alone may provide inquisitive minds with some indication of how responsive and accountable employees of the relevant company are. For example, if a large number of invitations have been sent to a particular company over a long period of time, and yet nobody from that company has ever established a selling entity account, then these facts alone may say something about the particular company. Control passes to block 1078.

According to one embodiment of the invention, the message recipient can respond to the e-mail message by sending a return e-mail message to the server device. The message recipient can respond to the buying entity's question(s) within such a return e-mail message. In block 1078 (which may occur after a specified amount of time has passed following the operations of block 1076), a determination is made as to whether a response to the buying entity's question(s) has been received. If a response has been received, then control passes to block 1080. Otherwise, control passes to block 1082 (in FIG. 10F).

In block 1080, the answers to the buying entity's questions are forwarded or otherwise sent to the buying entity. For example, server device 110 may forward, to the buying entity's associated e-mail address, a return e-mail message that server device 110 received from a company contact. Control passes to block 1082 (in FIG. 10F).

Referring now to FIG. 10F, in block 1082, a determination is made as to whether any selling entity account associated with the identifying information received in block 1006 has been established. For example, server device 110 can search all of the existing selling entity accounts to determine whether any of the seller attributes associated with those accounts contain the identifying information. If such a selling entity account has been established, then control passes to block 1086. Otherwise, control passes to block 1084.

In block 1084, all of the buying entities that have caused invitations (to establish a selling entity account) to be sent to the company are automatically sent an alert, as long as those buying entities have not previously opted to not receive alerts, as discussed below. The alert indicates that another buying entity has caused an invitation to be sent to the company. Each alert also may comprise a mechanism (e.g., a control or a link) through which an alert recipient can indicate his election to not receive any further alerts, if he so desires.

For example, server device 110 may send such alerts as e-mail messages to the appropriate buying entities—those buying entities who have previously caused invitations of the kind described in block 1074 to be sent to the company to which the e-mail message was sent in block 1074. Thus, in one embodiment of the invention, each time that a buying entity causes such an invitation to be sent to a company, server device 110 stores, in association with that buying entity's account, data that indicates that the buying entity has caused an invitation to be sent to that particular company, so that the buying entity can be alerted when later invitations are sent to that particular company. Additionally, the alerts may indicate the date and number described above with reference to block 1076. Control passes back to 1082.

Alternatively, in block 1086, all of the buying entities that have caused invitations (to establish a selling entity account) to be sent to the company are automatically sent an alert, as long as those buying entities have not previously opted to not receive alerts, as discussed above. The alert indicates that at least one selling entity account associated with the company to which the e-mail message was sent in block 1074 has been established. For example, server device 110 may send such alerts as e-mail messages to the appropriate buying entities—those buying entities who have previously caused invitations of the kind described in block 1074 to be sent to the company to which the e-mail message was sent in block 1074. The alerts might indicate the name of the company and the fact that someone from that company has "joined" by establishing a selling entity account, for example.

As is discussed above, in one embodiment of the invention, the alerts described with reference to block 1086 are sent to all buying entities that have previously caused invitations to be sent to the relevant company. However, in an alternative embodiment of the invention, no such alert is sent to a particular buying entity unless and until the newly established seller entity account associated with the relevant company has achieved (a) a rating that is at least as high as a target rating specified by the particular buying entity, and/or (b) a filter score (computer based on the particular buying entity's associated filter criteria) that is at least as high as a target filter score specified by the particular buying entity (as is described above with reference to block 1066).

According to one embodiment of the invention, after the operations of block 1086 have been performed, the technique illustrated in FIGS. 10A-F is finished.

XIV. Company Ratings Overview Display

Figure 12C:
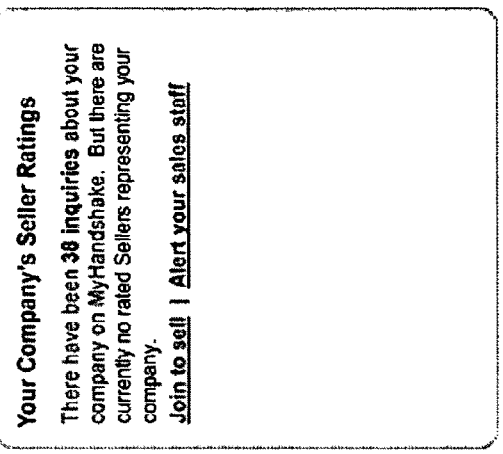
FIGS. 12A-C show examples of a company ratings overview display, in accordance with an embodiment of the invention.
Figure 12B:
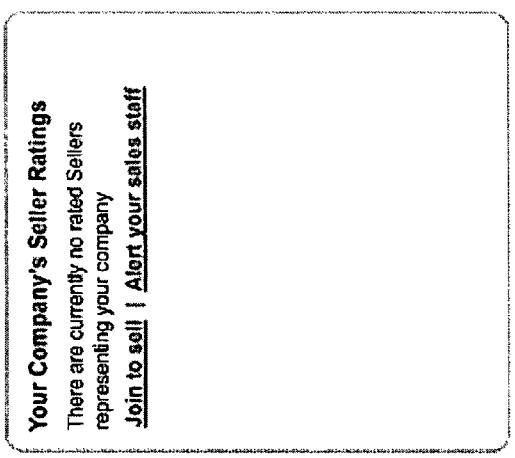
Figure 12A:
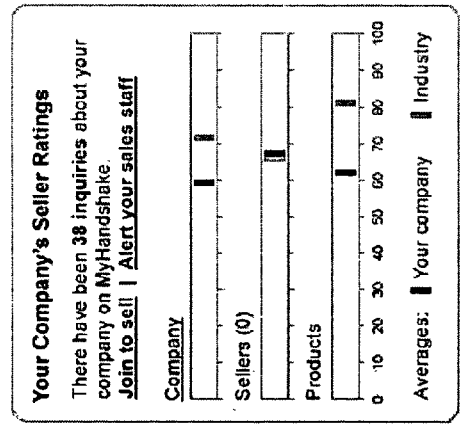

FIGS. 12A-C show examples of a company ratings overview display, in accordance with an embodiment of the invention. The company ratings overview display helps both buying entities and selling entities to know how they are perceived in an on-line marketplace such as that realized by the system described above. Through the system described above, buying entities and/or selling entities may provide ratings for companies, selling entities, and products. These ratings are stored in association with the companies, selling entities, and products to which they pertain.

A buying entity or selling entity may specify a company with which that entity is associated. The company may be associated with one of several defined industry categories. Using the system described above, a buying entity or selling entity may view a company ratings overview that shows ratings that have been provided for that entity's associated company. As shown in FIG. 12A, the ratings overview may indicate an average rating for a particular company and an average rating for all other companies that are associated with the same industry category as the particular company ("companies in the same industry category"). The ratings overview may indicate an average rating for selling entities that are associated with the particular company and an average rating for all selling entities that are associated with companies in the same industry category. The ratings overview may indicate an average rating for products that are associated with the particular company and an average rating for all products that are associated with companies in the same industry category. Thus, an entity can quickly determine how his company compares to other companies in the same industry category.

In one embodiment of the invention, the company ratings overview additionally indicates how many inquiries pertaining to the entity's company have been received from other users of the system described above. In one embodiment of the invention, the company ratings overview indicates whether or not there currently are any rated selling entities (i.e., selling entity accounts for which at least one rating has been received) that are associated with entity's company. In FIGS. 12B, and 12C, the company ratings overview indicates to the entity that no rated selling entities currently are associated with the entity's company. If no inquiries regarding the entity's company have been received, then a company ratings overview such as that shown in FIG. 12B may be displayed. Alternatively, if a least one inquiry regarding the entity's company has been received, then a company ratings overview such as that shown in FIG. 12C may be displayed.

As shown in FIGS. 12A-C, the company ratings overview may include links labeled "join to sell" and "alert your sales staff." If a buying entity activates the "join to sell" link, then the buying entity may be directed to a page through which a selling account may be established and associated with the buying entity's company. If a buying entity activates the "alert your sales staff" link, then the buying entity may be directed to a page through which the buying entity can cause an alert to be sent (i.e., via specified e-mail addresses) to specified sellers who work for the buying entity's company. The alerts may invite the alert recipients to establish selling entity accounts with the system described above.

XV. Implementation Mechanisms, Alternatives & Extensions

Figure 9:
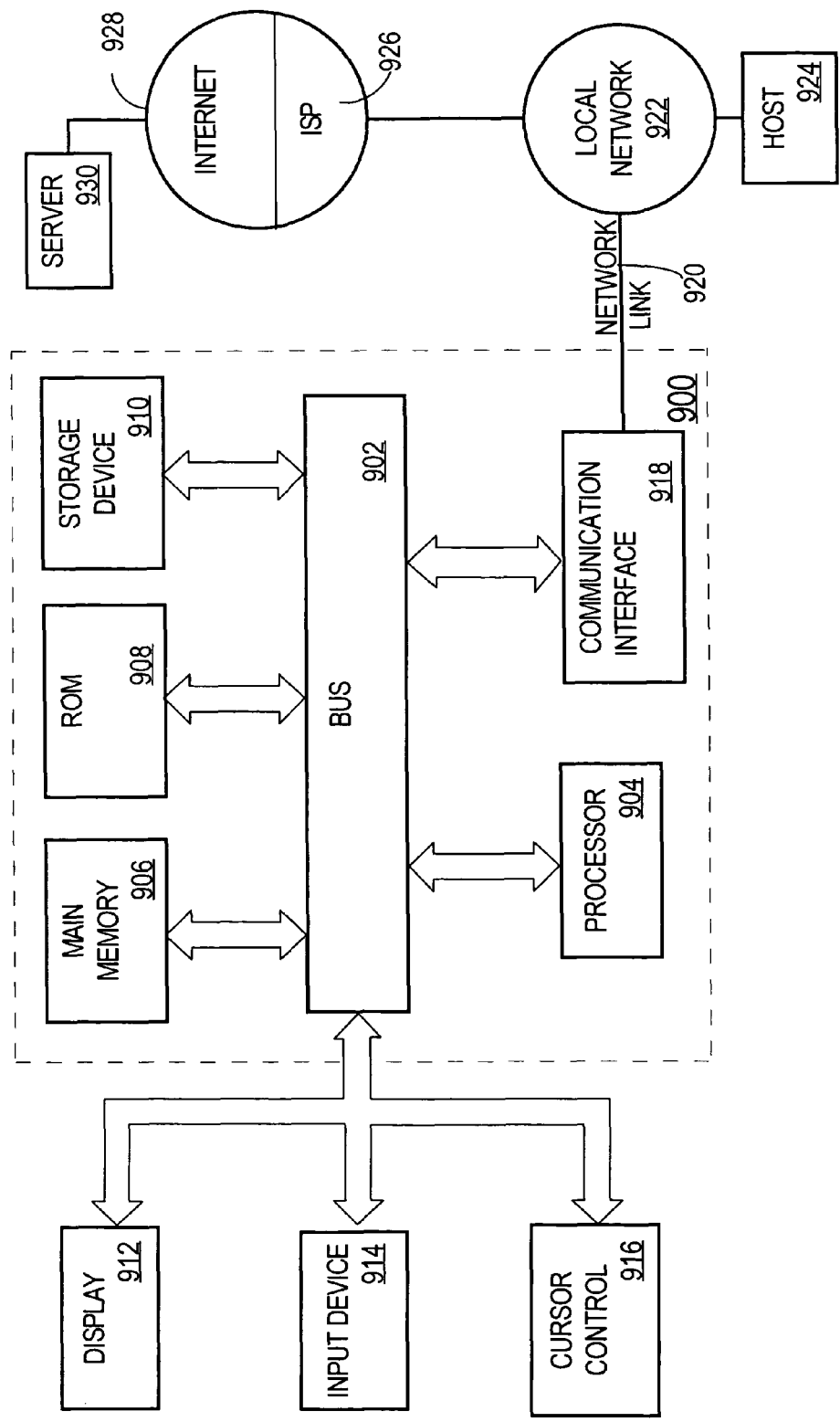
FIG. 9 is a block diagram that illustrates a computer system upon which an embodiment of the invention may be implemented.

The approach described herein for connecting buying entities and selling entities is applicable to a variety of contexts and implementations and is not limited to a particular context or implementation. FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for obtaining information about a seller, the method comprising machine-implemented steps of:
   receiving, from a user, over a computer network, input that indicates identifying information;
   determining, based on data stored on a machine-readable medium, whether there exist any selling entity accounts that are associated with the identifying information; and
   in response to a determination that at least one selling entity account is associated with the identifying information, sending, toward the user, over a computer network, stored data associated with one or more particular selling entity accounts that are associated with the identifying information;
   wherein the stored data associated with the one or more particular selling entity accounts comprises one or more ratings for the one or more particular selling entity accounts;
   wherein the one or more ratings were submitted by one or more people other than (a) the user and (b) selling entities associated with the one or more particular selling entity accounts; and
   wherein the identifying information comprises at least one of a company name, a telephone number, a uniform resource locator (URL), a product name, and a service name.

2. The method of claim 1, further comprising:
   in response to a determination that no selling entity accounts are associated with the identifying information, sending, toward the user, over a computer network, stored data associated with one or more other selling entity accounts that are associated with an industry category with which a company identified in the identifying information is associated.

3. The method of claim 1, further comprising:
   for each selling entity account in the one or more particular selling entity accounts, determining a separate filter score that is based on an extent to which attributes associated with that selling entity account satisfy filter criteria that the user specified; and
   ranking the one or more particular selling entity accounts based on filter scores determined for the one or more particular selling entity accounts.

4. The method of claim 1, further comprising:
   determining whether the user is associated with a buying entity account; and
   in response to determining that the user is not associated with a buying entity account, sending, toward the user, over a computer network, an invitation that invites the user to establish a buying entity account;
   wherein the invitation tells the user that the user can obtain a customized version of the stored data that is associated with one or more particular selling entity accounts if the user establishes a buying entity account.

5. The method of claim 1, further comprising:
   receiving, from the user, over a computer network, a question; and
   in response to receiving the question, sending, over a computer network, to a particular selling entity that is associated with at least one of the one or more particular selling entity accounts, a message that indicates the question;
   wherein the message does not identify the user.

6. The method of claim 1, further comprising:
   determining whether any selling entity account is associated with a particular company that is associated with the user; and
   in response to a determination that there are no selling entity accounts that are associated with the particular company, sending, toward the user, over a computer network, an invitation that invites the user to establish a selling entity account;
   wherein the invitation tells the user that others who search for the particular company will not be able to obtain information about the particular company unless a selling entity account associated with particular company is established.

7. The method of claim 1, further comprising:
   receiving, from the user, over a computer network, a question; and
   in response to receiving the question, sending, over a computer network, to a person who is associated with a company with which no selling entity account is associated, a message that indicates the question;
   wherein the message invites at least the person to establish a selling entity account.

8. The method of claim 1, further comprising:
   in response to a determination that no selling entity accounts are associated with the identifying information, sending, toward the user, over a computer network, a request for contact data for a company that is associated with the identifying information;
   receiving the contact data from the user over a computer network; and
   in response to receiving the contact data, sending a message to an e-mail address that is related to the contact data;
   wherein the message comprises a question from the user; and
   wherein the message invites a person to establish a selling entity account.

9. The method of claim 8, further comprising:
   storing data that indicates a date on which the message was sent;

updating a stored counter that indicates a number of times that messages comprising invitations to establish a selling entity account have been sent to e-mail addresses that are associated with the company; and updating a web page that identifies the company, the date, and the number.

10. The method of claim 8, further comprising:

in response to sending the message, sending, to one or more buying entities that previously caused messages to be sent to an e-mail address that is associated with the company, an alert that indicates that another message has been sent to an e-mail address that is associated with the company.

11. The method of claim 1, further comprising:

if no selling entity accounts were previously associated with the identifying information, determining whether a selling entity account that is associated the identifying information has been established; and in response to a determination that a selling entity account that is associated with the identifying information has been established, sending, to one or more buying entities that previously caused messages to be sent to an e-mail address that is associated with the identifying information, an alert that indicates that a selling entity account that is associated with the identifying information has been established.

12. The method of claim 1, further comprising:

determining whether a particular selling entity account is associated with a rating that is at least as high as a target rating specified by the user; and in response to a determination that the particular selling entity account is associated with a rating that is at least as high as the target rating, sending an alert to the user over a computer network.

13. The method of claim 1, further comprising:

determining a filter score based at least in part on an extent to which attributes associated with a particular selling entity account satisfy filter criteria specified by the user.

determining whether the filter score is at least as high as a target filter score specified by the user; and in response to a determination that the filter score is at least as high as the target filter score, sending an alert to the user over a computer network.

14. A non-transitory machine-readable medium for promoting business relationships, the non-transitory machine-readable medium carrying one or more sequences of instructions which, when executed by one or more processors, cause the one or more processors to perform steps comprising:

receiving, from a user, over a computer network, input that indicates identifying information;

determining, based on data stored on a machine-readable medium, whether there exist any selling entity accounts that are associated with the identifying information; and in response to a determination that at least one selling entity account is associated with the identifying information, sending, toward the user, over a computer network, stored data associated with one or more particular selling entity accounts that are associated with the identifying information;

wherein the stored data associated with the one or more particular selling entity accounts comprises one or more ratings for the one or more particular selling entity accounts;

wherein the one or more ratings were submitted by one or more people other than (a) the user and (b) selling entities associated with the one or more particular selling entity accounts; and wherein the identifying information comprises at least one of a company name, a telephone number, a uniform resource locator (URL), a product name, and a service name.

15. The machine-readable medium of claim 14, wherein the one or more sequences of instructions, when executed by the one or more processors, further cause the one or more processors to perform steps comprising:

in response to a determination that no selling entity accounts are associated with the identifying information, sending, toward the user, over a computer network, stored data associated with one or more other selling entity accounts that are associated with an industry category with which a company identified in the identifying information is associated.

16. The machine-readable medium of claim 14, wherein the one or more sequences of instructions, when executed by the one or more processors, further cause the one or more processors to perform steps comprising:

for each selling entity account in the one or more particular selling entity accounts, determining a separate filter score that is based on an extent to which attributes associated with that selling entity account satisfy filter criteria that the user specified; and ranking the one or more particular selling entity accounts based on filter scores determined for the one or more particular selling entity accounts.

17. The machine-readable medium of claim 14, wherein the one or more sequences of instructions, when executed by the one or more processors, further cause the one or more processors to perform steps comprising:

determining whether the user is associated with a buying entity account; and in response to determining that the user is not associated with a buying entity account, sending, toward the user, over a computer network, an invitation that invites the user to establish a buying entity account;

wherein the invitation tells the user that the user can obtain a customized version of the stored data that is associated with one or more particular selling entity accounts if the user establishes a buying entity account.

18. The machine-readable medium of claim 14, wherein the one or more sequences of instructions, when executed by the one or more processors, further cause the one or more processors to perform steps comprising:

receiving, from the user, over a computer network, a question; and in response to receiving the question, sending, over a computer network, to a particular selling entity that is associated with at least one of the one or more particular selling entity accounts, a message that indicates the question;

wherein the message does not identify the user.

19. The machine-readable medium of claim 14, wherein the one or more sequences of instructions, when executed by the one or more processors, further cause the one or more processors to perform steps comprising:

determining whether any selling entity account is associated with a particular company that is associated with the user; and in response to a determination that there are no selling entity accounts that are associated with the particular company, sending, toward the user, over a computer network, an invitation that invites the user to establish a selling entity account;

wherein the invitation tells the user that others who search for the particular company will not be able to obtain information about the particular company unless a selling entity account associated with particular company is established.

20. The machine-readable medium of claim 14, wherein the one or more sequences of instructions, when executed by the one or more processors, further cause the one or more processors to perform steps comprising:
receiving, from the user, over a computer network, a question; and
in response to receiving the question, sending, over a computer network, to a person who is associated with a company with which no selling entity account is associated, a message that indicates the question;
wherein the message invites at least the person to establish a selling entity account.

21. The machine-readable medium of claim 14, wherein the one or more sequences of instructions, when executed by the one or more processors, further cause the one or more processors to perform steps comprising:
in response to a determination that no selling entity accounts are associated with the identifying information, sending, toward the user, over a computer network, a request for contact data for a company that is associated with the identifying information;
receiving the contact data from the user over a computer network; and
in response to receiving the contact data, sending a message to an e-mail address that is related to the contact data;
wherein the message comprises a question from the user; and
wherein the message invites a person to establish a selling entity account.

22. The machine-readable medium of claim 21, wherein the one or more sequences of instructions, when executed by the one or more processors, further cause the one or more processors to perform steps comprising:
storing data that indicates a date on which the message was sent;
updating a stored counter that indicates a number of times that messages comprising invitations to establish a selling entity account have been sent to e-mail addresses that are associated with the company; and
updating a web page that identifies the company, the date, and the number.

23. The machine-readable medium of claim 21, wherein the one or more sequences of instructions, when executed by the one or more processors, further cause the one or more processors to perform steps comprising:
in response to sending the message, sending, to one or more buying entities that previously caused messages to be sent to an e-mail address that is associated with the company, an alert that indicates that another message has been sent to an e-mail address that is associated with the company.

24. The machine-readable medium of claim 14, wherein the one or more sequences of instructions, when executed by the one or more processors, further cause the one or more processors to perform steps comprising:
if no selling entity accounts were previously associated with the identifying information, determining whether a selling entity account that is associated the identifying information has been established; and
in response to a determination that a selling entity account that is associated with the identifying information has been established, sending, to one or more buying entities that previously caused messages to be sent to an e-mail address that is associated with the identifying information, an alert that indicates that a selling entity account that is associated with the identifying information has been established.

25. The machine-readable medium of claim 14, wherein the one or more sequences of instructions, when executed by the one or more processors, further cause the one or more processors to perform steps comprising:
determining whether a particular selling entity account is associated with a rating that is at least as high as a target rating specified by the user; and
in response to a determination that the particular selling entity account is associated with a rating that is at least as high as the target rating, sending an alert to the user over a computer network.

26. The machine-readable medium of claim 14, wherein the one or more sequences of instructions, when executed by the one or more processors, further cause the one or more processors to perform steps comprising:
determining a filter score based at least in part on an extent to which attributes associated with a particular selling entity account satisfy filter criteria specified by the user.
determining whether the filter score is at least as high as a target filter score specified by the user; and
in response to a determination that the filter score is at least as high as the target filter score, sending an alert to the user over a computer network.

* * * * *